United States Patent
Kawamura et al.

(10) Patent No.: US 7,912,030 B2
(45) Date of Patent: Mar. 22, 2011

(54) BASE STATION AND COMMUNICATION SYSTEM

(75) Inventors: Teruo Kawamura, Yokosuka (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 475 days.

(21) Appl. No.: 12/064,541

(22) PCT Filed: Aug. 21, 2006

(86) PCT No.: PCT/JP2006/316327
§ 371 (c)(1),
(2), (4) Date: Aug. 4, 2008

(87) PCT Pub. No.: WO2007/023767
PCT Pub. Date: Mar. 1, 2007

(65) Prior Publication Data
US 2009/0135791 A1     May 28, 2009

(30) Foreign Application Priority Data

Aug. 23, 2005   (JP) ................ 2005-241900
Oct. 31, 2005   (JP) ................ 2005-317571

(51) Int. Cl.
*H04J 13/00*     (2006.01)
(52) U.S. Cl. .................................... 370/342
(58) Field of Classification Search .......... 370/208, 370/335, 342
See application file for complete search history.

(56) References Cited

U.S. PATENT DOCUMENTS

2006/0126572 A1*  6/2006  Mutou .................. 370/335
2008/0298445 A1* 12/2008  Richardson et al. .... 375/224
2009/0227261 A1*  9/2009  Tiirola et al. ........... 455/450

FOREIGN PATENT DOCUMENTS

| JP | 8-19038 A | 1/1996 |
| JP | 8-97749 A | 4/1996 |
| JP | 10-13918 A | 1/1998 |

(Continued)

OTHER PUBLICATIONS

E. Hong, et al., "Synchronous Transmission Technique for the Reverse Link in DS-CDMA Terrestrial Mobile Systems," Nov. 1999, IEEE Trans. Com. vol. 47, No. 11, 4 pages.

(Continued)

*Primary Examiner* — Melvin Marcelo
(74) *Attorney, Agent, or Firm* — Osha • Liang LLP

(57) ABSTRACT

A base station includes: a first reception timing detecting unit configured to detect a reception timing of a packet received from a first mobile station of multiple mobile stations which is situated in a first sector; a second reception timing detecting unit configured to detect a reception timing of a packet received from a second mobile station of the multiple mobile stations which is situated in a second sector; a transmission timing determining unit configured to determine transmission timings of signals transmitted from the first mobile station and the second mobile station based on the reception timings detected by the first reception timing detecting unit and the second reception timing detecting unit; a control information generating unit configured to generate transmission timing control information for the first mobile station and the second mobile station based on the transmission timings; and a radio resource allocating unit configured to allocate orthogonal radio resources to the first mobile station and the second mobile station.

12 Claims, 25 Drawing Sheets

FOREIGN PATENT DOCUMENTS

JP          2005-130256 A       5/2005

OTHER PUBLICATIONS

3GPP TR 25.854 V5.0.0, Dec. 2001, "Study Report for Uplink Synchronous Transmission Scheme (USTS)", 46 pages.

International Search Report issued in International Application No. PCT/JP2006/316327, mailed on Dec. 5, 2006, with translation (5 pages).

Written Opinion (Japanese only) issued in International Application No. PCT/JP2006/316327 dated Nov. 27, 2006, 3 pages.

* cited by examiner

BASE STATION AND COMMUNICATION SYSTEM

BACKGROUND OF THE INVENTION

1. Field of the Invention

The present invention relates to a base station and a communication system which perform transmission timing control in packet access. Specifically, the present invention relates to a base station and a communication system which orthogonalize uplink signals from multiple mobile stations by controlling transmission timings of signals in packet access to be synchronized among mobile stations which are situated in multiple sectors in the same base station.

2. Description of the Related Art

In a cellular system with a multiple-cell environment, it is proposed that an increase in the system capacity be achieved by employing one-cell frequency reuse that uses the same frequency among adjacent cells. In order to achieve one-cell frequency reuse, gains for reducing interference from the adjacent cells are needed. Typically, one-cell frequency reuse is achieved by reducing interference from the adjacent cells by means of a spreading gain obtained from spreading and a channel coding gain obtained from error correcting coding according to the principles of CDMA (Code Division Multiple Access). In addition to one-cell frequency reuse, a further increase in the system capacity is achieved by dividing one cell into multiple areas called sectors and performing communications independently in each sector based on the principles of CDMA.

When one-cell frequency reuse is achieved, each mobile station can simultaneously access the base station in uplink communications from the mobile station to the base station. The reason why each mobile station can simultaneously access the base station is that the base station can distinguish and demodulate (decode) signals transmitted from multiple mobile stations by means of the spreading gain, even if a collision occurs among signals transmitted from the multiple mobile stations. However, the collision indeed occurs among signals transmitted from the multiple mobile stations when the mobile stations simultaneously access the base station. Although the effect of this collision can be reduced to some extent by means of the spreading gain, the signals interfere with each other (multiple-access interference), which results in degrading communication quality. The multiple-access interference occurs not only within a single cell but also among sectors. In other words, the mobile station close to a sector boundary can experience multiple-access interference in both sectors.

In order to reduce multiple-access interference, it is proposed that transmission timing control be performed in CDMA communications employing one-cell frequency reuse (for example, Non-Patent References 1 and 2).

With reference to FIG. 1, the transmission timing control is described. FIG. 1 shows a schematic flowchart illustrating transmission timing control in accordance with the related art. First, the base station BS transmits a pilot signal on a common pilot channel to two mobile stations MS1 and MS2 in the same sector (S1). The mobile stations MS1 and MS2 which receive the pilot signal on the common pilot channel start transmitting signals based on the reception timing of the pilot signal (S2). Specifically, because the distance from the base station varies depending on the mobile station, the mobile station MS2 close to the base station receives the pilot signal earlier than the mobile station MS1 far from the mobile station. The mobile stations MS1 and MS2 respectively transmit signals to the base station BS according to the arrival time of the pilot signal on the common pilot channel. The base station BS measures a reception timing difference between these signals (S3). The base station BS generates transmission timing control information based on the reception timing difference and transmits it to the mobile stations MS1 and MS2 (S4). Each mobile station starts communications based on the received transmission timing control information (S5). When each mobile station controls the transmission timing in this manner, the reception timings of the signals from the mobile stations MS1 and MS2 are synchronized at the base station BS (S6).

The transmission timing control allows reception timings of paths with maximum reception power for the respective mobile stations to be synchronized at the base station, and allows signals from the mobile stations to be orthogonal on the synchronized paths with maximum reception power. Accordingly, the transmission timing control can reduce multiple-access interference and improve communication quality.

[Non-Patent Reference 1] E. Hong, S. Hwang, K. Kim, and K. Whang, "Synchronous transmission technique for the reverse link in DS-CDMA," IEEE Trans. on Commun., vol. 47, no. 11, pp. 1632-1635, November 1999

[Non-Patent Reference 2] "Study report for uplink synchronous transmission scheme," 3GPP, 3G TR 25.854

SUMMARY OF THE INVENTION

Problem(s) to be Solved by the Invention

However, the transmission timing control proposed in the Non-Patent References 1 and 2 focuses on the mobile stations with a low information rate based on circuit switching in CDMA communications. In addition, it focuses on the transmission timing control within a single sector, because reception timings of signals from many mobile stations have to be synchronized. Furthermore, Direct Sequence CDMA is used in the CDMA communications proposed in the Non-Patent References 1 and 2. Under the Direct Sequence scheme, in order for the base station to orthogonalize signals transmitted from the mobile stations, synchronization at the chip level after spreading is required, which requires transmission timing control with high accuracy.

In the future, it is expected that packet access communications will be more important than circuit switching communications, in order to efficiently transmit both signals with various information rates and burst-generated data. When packet access is employed, it is expected that the following technologies will be applied for the purpose of efficient signal transmission.

(1) packet scheduling for determining, based on the propagation condition between each mobile station and the base station, which mobile station accesses the base station in each transmission slot; and (2) adaptive modulation for adaptively determining, based on the propagation condition between each mobile station and the base station, which radio parameters (a data modulation scheme and/or a coding rate) are used for communications between the mobile station and the base station.

In order to employ packet scheduling and/or adaptive modulation, it is necessary to measure the propagation condition between each mobile station and the base station by transmitting a pilot signal as a known signal on a pilot channel from each mobile station to the base station. Accordingly, multiple mobile stations may transmit the pilot signal on the pilot channel on the uplink. When the multiple mobile stations simultaneously transmit the pilot signal on the pilot channel, interference occurs among the pilot signals, which makes it more difficult to measure the propagation condition with high accuracy.

As mentioned above, the related art has the following problems.

(1) When transmission timing control is performed within each sector, signals transmitted from the mobile station at a sector boundary can cause multiple-access interference with signals in the adjacent sector which do not comply with the transmission timing control. However, the related art cannot solve the problem of degrading communication quality due to the multiple-access interference.

(2) The transmission timing control in accordance with the related art focuses on circuit switching based signals. Assuming that packet access is performed, the related art cannot reduce the effect of multiple-access interference to efficiently transmit signals on the pilot channel, the other control channels, or data channels, when packet scheduling or adaptive modulation is added.

(3) The synchronization accuracy required for the transmission timing control in accordance with the related art is at the chip level. This requires very accurate synchronization.

In view of the aforementioned problems in the related art, it is a general object of the present invention to orthogonalize uplink signals from multiple mobile stations by controlling transmission timings of signals in packet access among mobile stations which are situated in multiple sectors in the same base station.

Means for Solving the Problem

In one embodiment of the present invention, there is provided a base station which performs transmission timing control for multiple mobile stations, including:

a first reception timing detecting unit configured to detect a reception timing of a packet received from a first mobile station of the multiple mobile stations which is situated in a first sector;

a second reception timing detecting unit configured to detect a reception timing of a packet received from a second mobile station of the multiple mobile stations which is situated in a second sector;

a transmission timing determining unit configured to determine transmission timings of signals transmitted from the first mobile station and the second mobile station based on the reception timings detected by the first reception timing detecting unit and the second reception timing detecting unit;

a control information generating unit configured to generate transmission timing control information for the first mobile station and the second mobile station based on the transmission timings; and a radio resource allocating unit configured to allocate orthogonal radio resources to the first mobile station and the second mobile station.

In another embodiment of the present invention, there is provided a communication system including multiple mobile stations and a base station which performs transmission timing control for the multiple mobile stations, wherein:

the base station includes a first reception timing detecting unit configured to detect a first reception timing of a packet received from a first mobile station of the multiple mobile stations which is situated in a first sector;

a second reception timing detecting unit configured to detect a second reception timing of a packet received from a second mobile station of the multiple mobile stations which is situated in a second sector;

a transmission timing determining unit configured to determine transmission timings of signals transmitted from the first mobile station and the second mobile station based on the first reception timing and the second reception timing;

a control information generating unit configured to generate transmission timing control information for the first mobile station and the second mobile station based on the transmission timings; and a radio resource allocating unit configured to allocate orthogonal radio resources to the first mobile station and the second mobile station; and the mobile station includes a transmission timing adjusting unit configured to adjust a transmission timing of a signal based on the transmission timing control information.

The radio resource allocating unit may allocate the radio resources in consideration of a timing error within a guard interval. Allocating the radio resources in this manner allows uplink signals from multiple mobile stations to be orthogonal by means of loose (or coarse) transmission timing control within the guard interval, for example.

EFFECT OF THE INVENTION

According to an embodiment of the present invention, it is possible to orthogonalize uplink signals from multiple mobile stations by controlling transmission timings of signals in packet access among mobile stations which are situated in multiple sectors in the same base station. For example, multiple-access interference among mobile stations which are situated in different sectors can be reduced, and thus communication quality can be improved.

DESCRIPTION OF THE PREFERRED EMBODIMENTS

Figure 1:
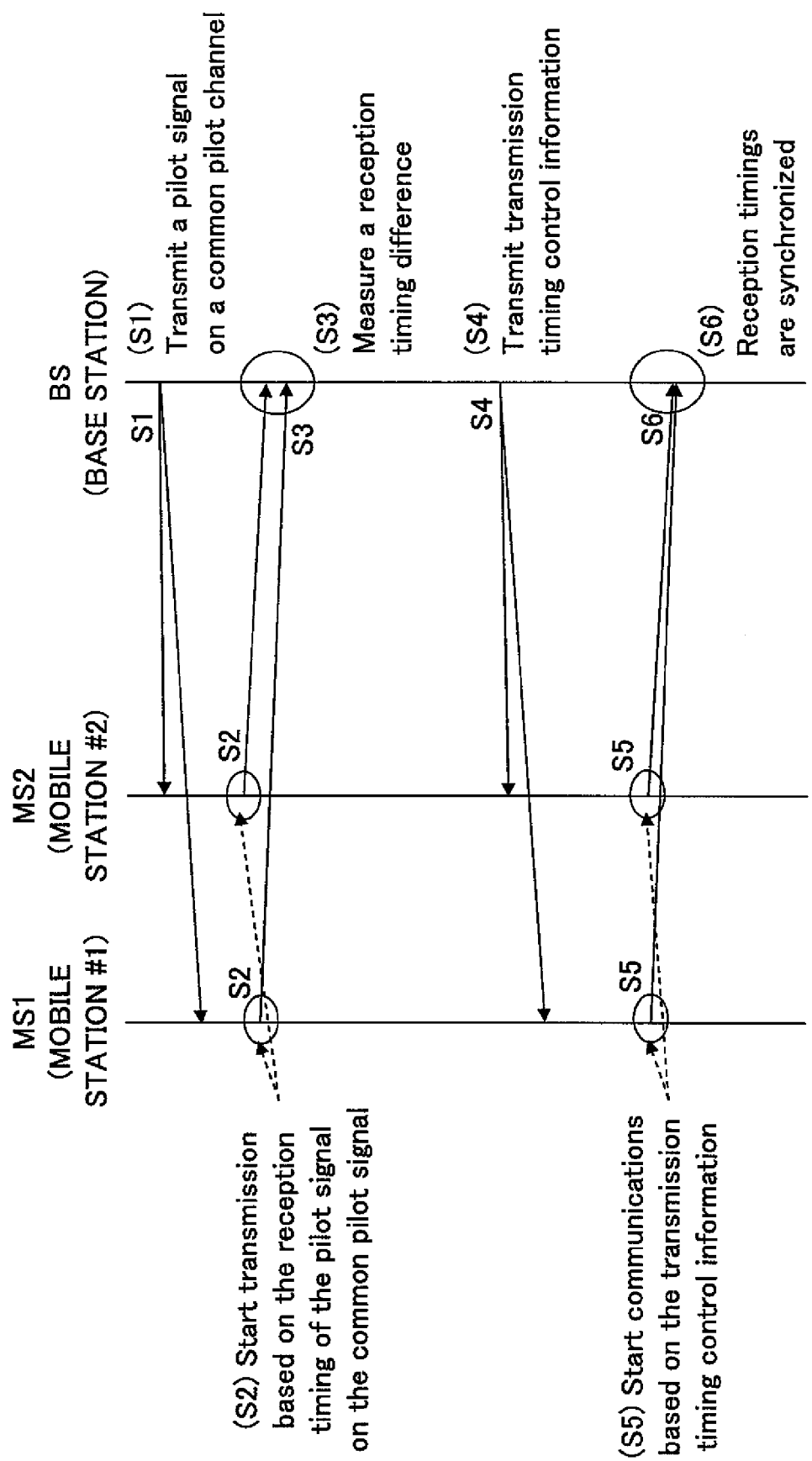
FIG. 1 shows a flowchart illustrating transmission timing control in accordance with the related art.

Description of Notations 10 base station
101-1, 101-2, 101-3 received signal modulating unit
103-1, 103-2, 103-3 reception timing detecting unit
105 transmission timing determining unit
107-1, 107-2, 107-3 control information generating unit
109-1, 109-2, 109-3 transmission signal generating unit
113 radio resource allocating unit
20 mobile station
201 pilot channel generating unit
203 data channel generating unit
205 channel multiplexing unit
207 scrambling code multiplying unit
209 transmission timing adjusting unit
30 base station
301-11, 301-12, 301-21, 301-22, 301-31, 301-32 received signal modulating unit
303-11, 303-12, 303-21, 303-22, 303-31, 303-32 reception timing detecting unit
305 transmission timing determining unit
307-11, 307-12, 307-21, 307-22, 307-31, 307-32 control information generating unit
309-11, 309-12, 309-21, 309-22, 309-31, 309-32 transmission signal generating unit
313 radio resource allocating unit
40 mobile station
401-1, 401-2 pilot channel generating unit
403-1, 403-2 data channel generating unit
405-1, 405-2 channel multiplexing unit
407-1, 407-2 scrambling code multiplying unit
409-1, 409-2 transmission timing adjusting unit
411 control unit

BEST MODE OF CARRYING OUT THE INVENTION

With reference to the accompanying drawings, a description is given below with regard to preferred embodiments of the present invention.

Figure 2:
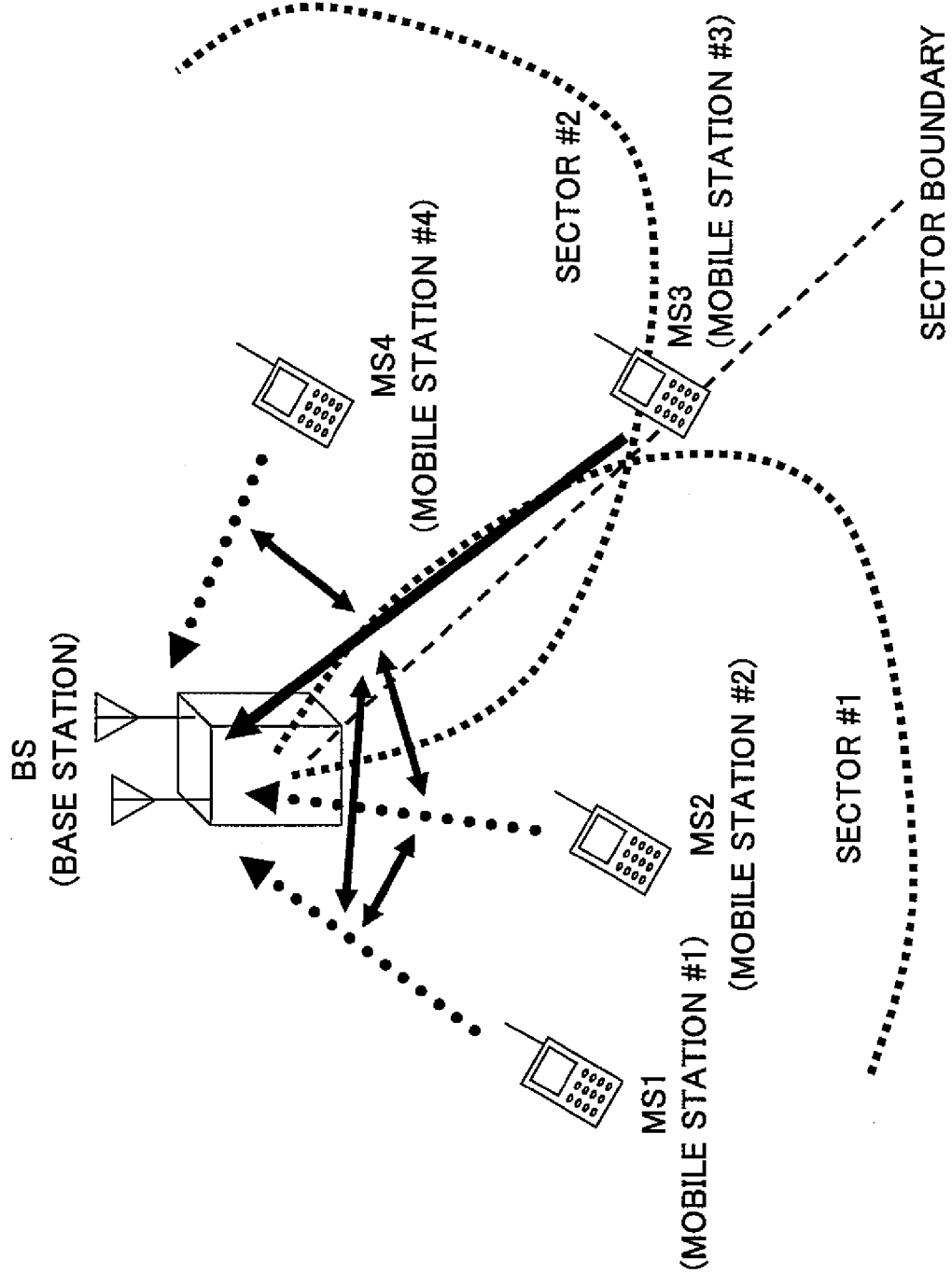
FIG. 2 shows an example of a communication system to which the present invention is applicable.

FIG. 2 shows an example of a communication system to which the present invention is applicable. The communication system includes a base station BS and mobile stations MSs. The base station covers a cell with multiple sectors. Typically, each mobile station belongs to one of the sectors. A mobile station #1 MS1 and a mobile station #2 MS2 belong to a sector #1, and a mobile station #4 MS4 belongs to a sector #2. However, a mobile station may be situated in a sector boundary between the sector #1 and the sector #2. A mobile station #3 is situated in the sector boundary. Signals transmitted from the mobile station #3 which is situated in the sector boundary may cause interference with signals in the sectors #1 and #2. In order to reduce the interference, the base station performs transmission timing control for the respective mobile stations within all sectors to synchronize the reception timings at the base station. When the reception timings at the base station are synchronized, the base station can allocate orthogonal radio resources to mobile stations within all sectors in the time, frequency, or code domain. This resource allocation can reduce multiple-access interference.

Although the structure of the base station, the structure of the mobile station, and the method of allocating radio resources are described below in terms of a pilot channel (reference signal), the present invention is applicable to orthogonalization of not only the pilot channel but also the other channels.

First Embodiment

Figure 3:
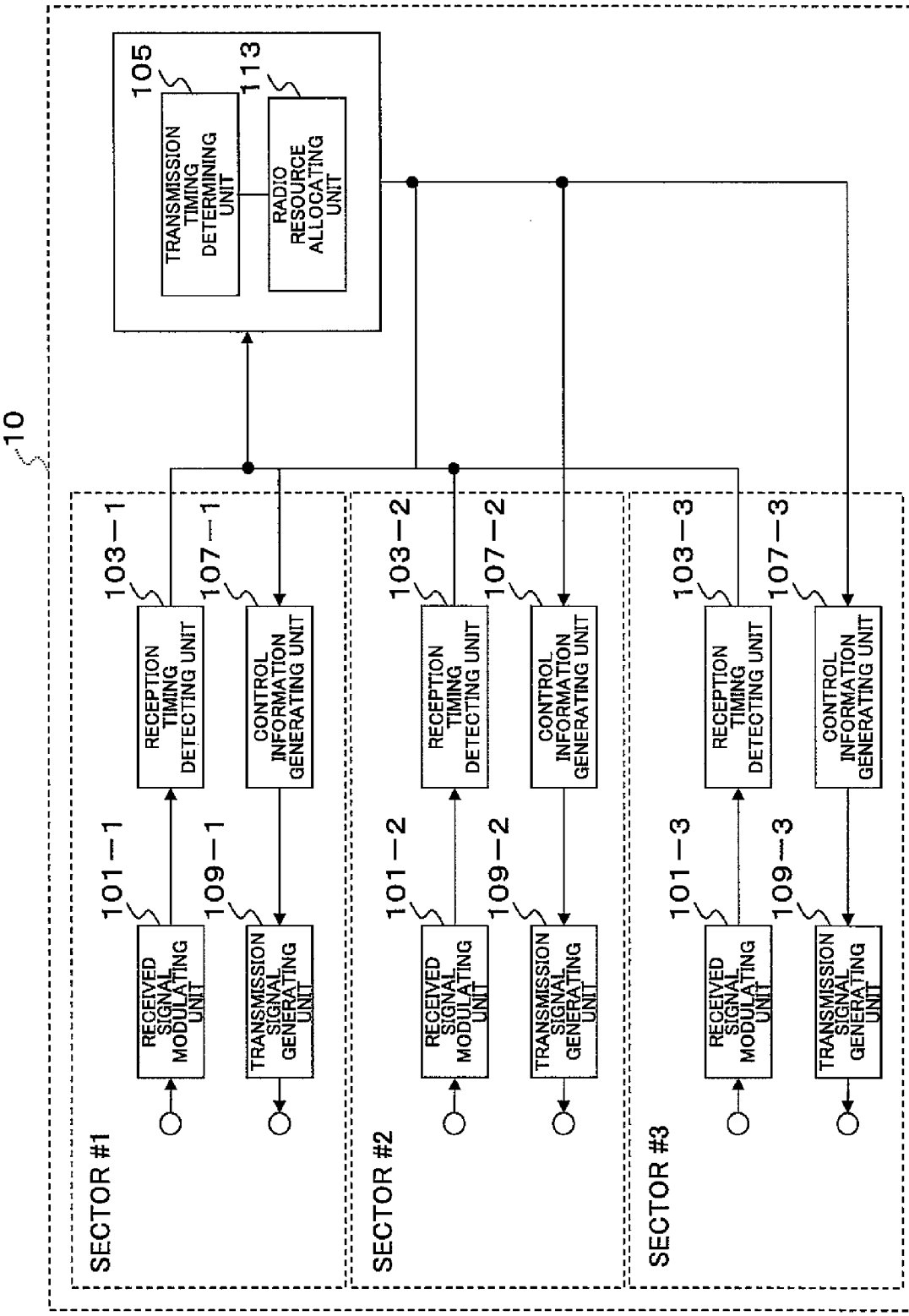
FIG. 3 shows a block diagram of a base station in accordance with first through third embodiments of the present invention.

FIG. 3 shows a block diagram of a base station 10 in accordance with a first embodiment of the present invention.

In the first embodiment, an approach for orthogonalizing signals from respective mobile stations in the time domain is described below.

The base station 10 includes received signal modulation units 101-1 through 101-3, reception timing detecting units 103-1 through 103-3, control information generating units 107-1 through 107-3, and transmission signal generating units 109-1 through 109-3 for sectors #1 through #3, respectively. The base station 10 further includes a transmission timing determining unit 105 and a radio resource allocating unit 113. The received signal modulation units 101-1 through 101-3 modulate signals received from the mobile stations. The reception timing detecting units 103-1 through 103-3 detect reception timings of the received signals and provide reception timing information to the transmission timing determining unit 105. The transmission timing determining unit 105 measures a reception timing difference based on reception timing information for each mobile station within all sectors in the base station. The transmission timing determining unit 105 calculates transmission timings so that signals transmitted from the respective mobile stations are synchronized within a guard interval. The radio resource allocating unit 113 generates radio resource allocation information for each mobile station so that signals transmitted from the respective mobile stations are orthogonal in the time domain. The control information generating units 107-1 through 107-3 generate transmission timing control information for the corresponding mobile stations based on the calculated transmission timings and the radio resource allocation information. The transmission signal generating units 109-1 through 109-3 generate transmission signals for the corresponding mobile stations. The corresponding transmission signal is transmitted to each mobile station.

Figure 4:
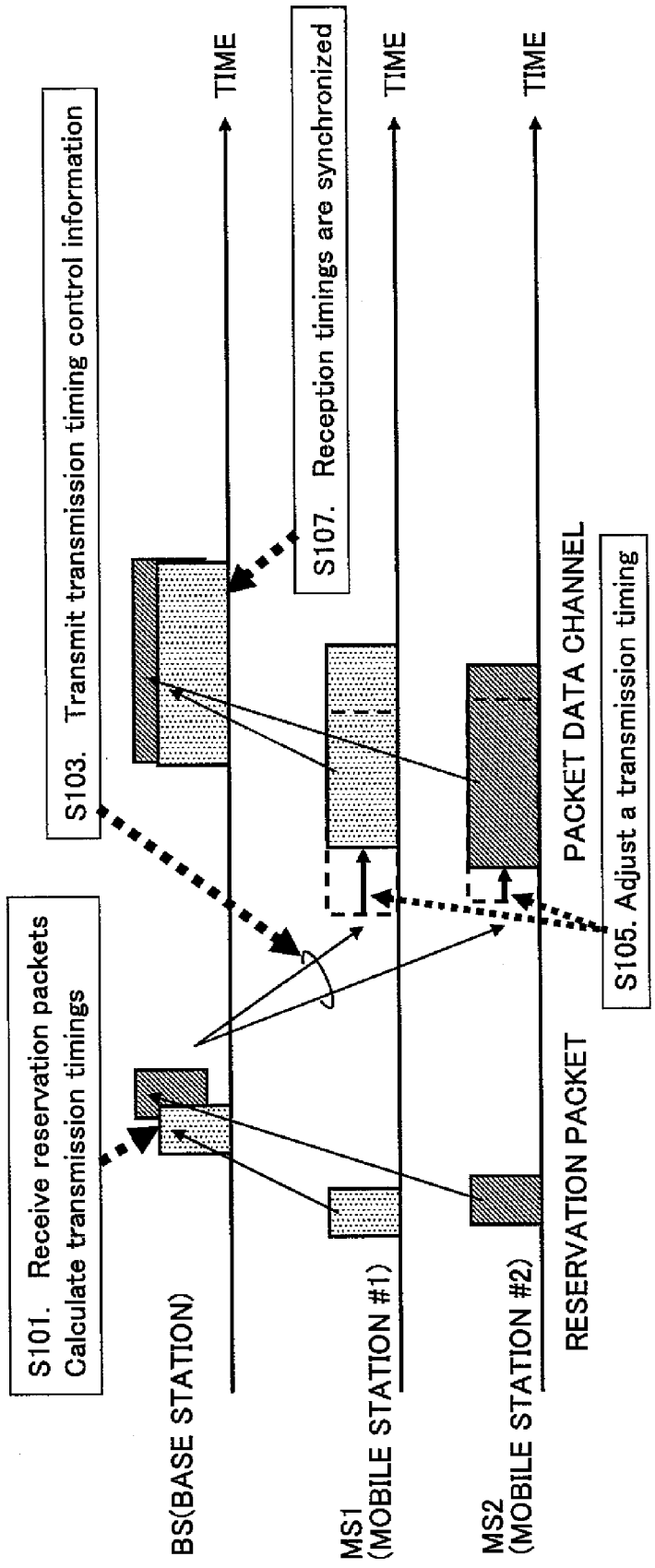
FIG. 4 shows a flowchart illustrating transmission timing control in a base station in accordance with a first embodiment of the present invention.

FIG. 4 shows a flowchart illustrating transmission timing control in the base station 10 shown in FIG. 3. The base station BS calculates transmission timings for respective mobile stations MS1 and MS2 based on signals (for example, reservation packets such as pilot signals and synchronization signals) received from the mobile stations MS1 and MS2 within all sectors (S101). In this case, the base station BS calculates transmission timings for all mobile stations within all sectors. The base station BS generates transmission timing control information based on the calculated transmission timing and transmits it to each mobile station on a downlink control channel (S103). Each mobile station adjust the transmission timing of a signal (on a packet data channel) based on the transmission timing control information (S105). Consequently, the reception timings of signals are synchronized among the mobile stations within all sectors in the base station (S105).

Figure 5:
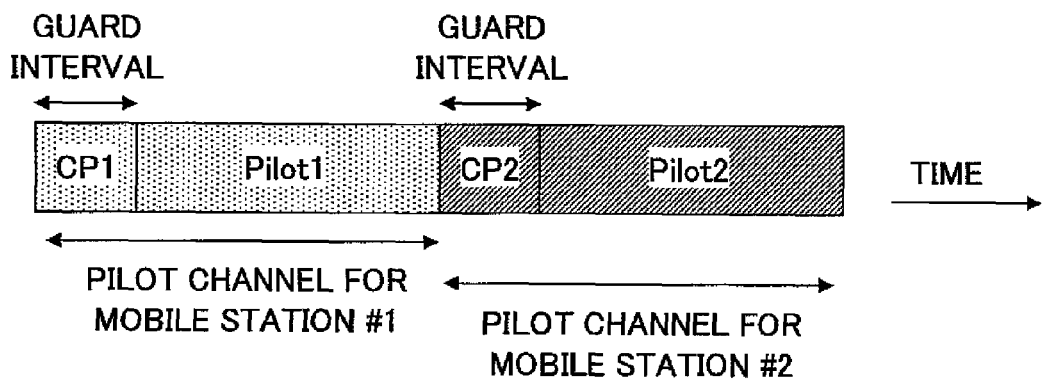
FIG. 5 shows a diagram illustrating orthogonality in the time domain at a base station in accordance with a first embodiment of the present invention.

FIG. 5 shows a diagram illustrating how signals (on pilot channels) from the respective mobile stations are orthogonal at the base station in the time domain. The following description focuses on orthogonalization of pilot channels, because the pilot signals (reference signals) play an important role such as measurement of the propagation path condition. However, the present invention is also applicable to orthogonalization of the other control channels or data channels.

FIG. 5 shows, on the time axis, pilot channels received at the base station from the mobile stations #1 and #2. As shown in FIG. 5, the pilot channel for the mobile station #1 and the pilot channel for the mobile station #2 do not interfere with each other on the time axis. This enables measurement of the propagation path condition with high accuracy. In addition, when guard intervals (Cyclic Prefixes) CP1 and CP2 are taken into consideration, orthogonalization is achieved with lower accuracy of transmission timing control by ignoring interference within the guard intervals at the base station.

Figure 6:
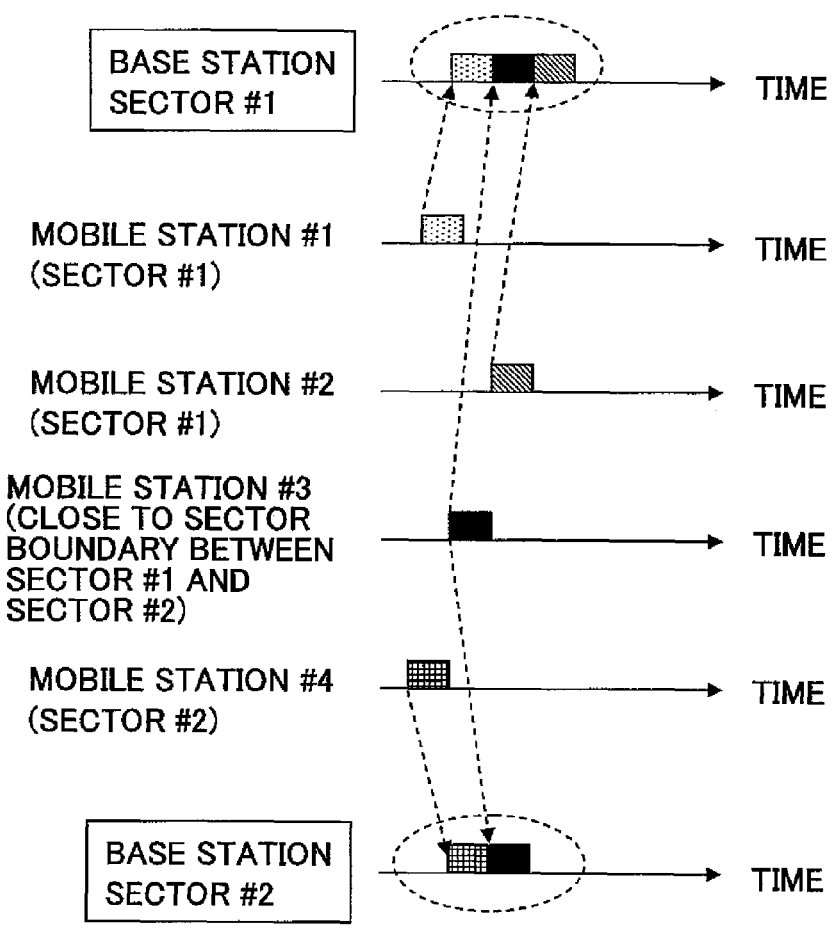
FIG. 6 shows a diagram illustrating orthogonality in the time domain at a base station in accordance with a first embodiment of the present invention.

FIG. 6 shows a diagram where orthogonalization in the time domain is achieved within all sectors. A signal from the mobile station #3 close to the sector boundary is orthogonal in the time domain to signals from the mobile stations #1 and #2 in the sector #1. At the same time, the signal from the mobile station #3 is orthogonal in the time domain to a signal from the mobile station #4 in the sector #2. Accordingly, the signal from the mobile station #3 close to the sector boundary does not interfere with the signals in both sectors #1 and #2, and thus communication quality can be improved.

Figure 7:
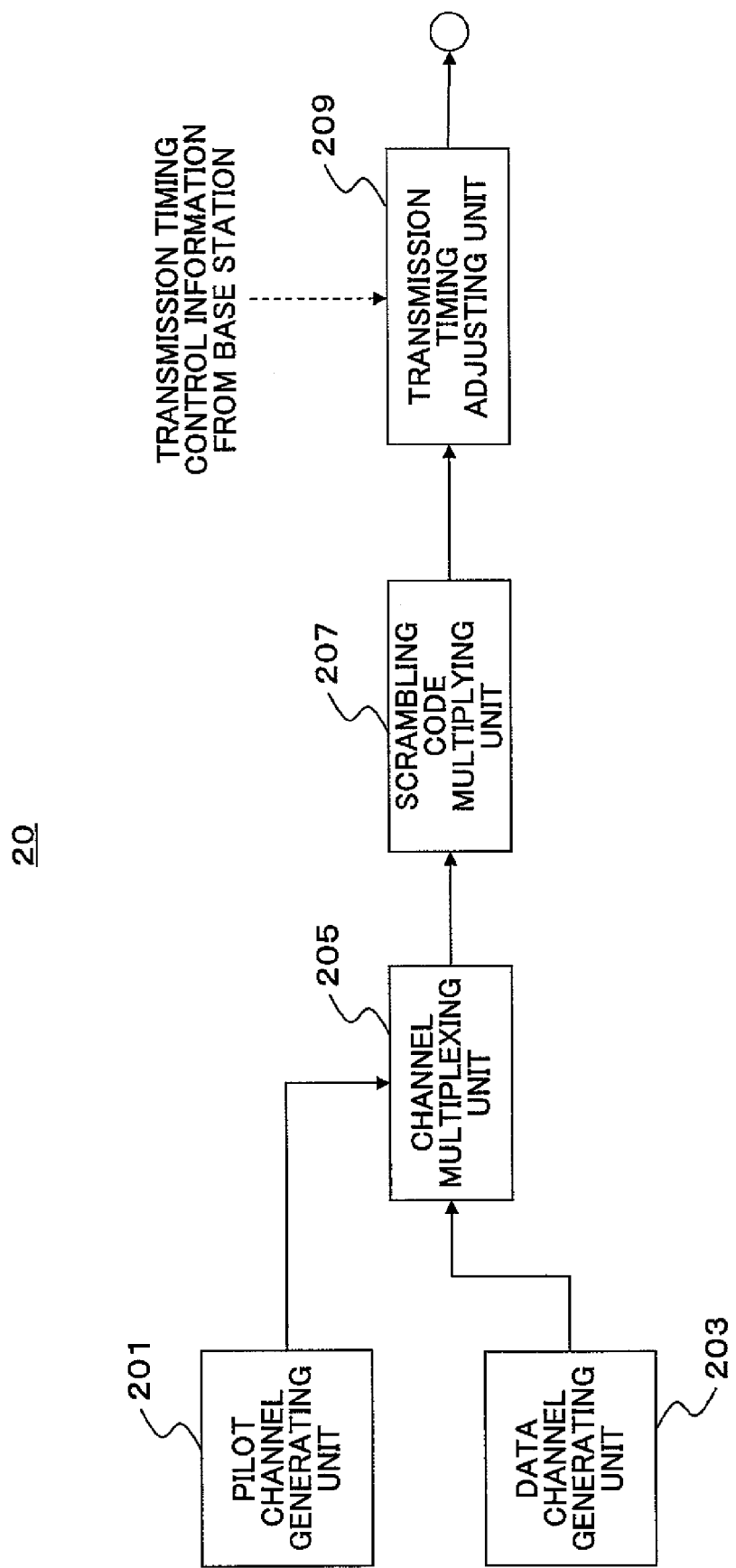
FIG. 7 shows a block diagram of a mobile station communicating with a base station in accordance with a first embodiment of the present invention.

FIG. 7 shows a block diagram of a mobile station 20 communicating with the base station 10. The mobile station 20 includes a pilot channel generating unit 201, a data channel generating unit 203 (as used herein, the data channel generating unit 203 includes the capability of generating a control channel), a channel multiplexing unit 205, a scrambling code multiplying unit 207, and a transmission timing adjusting unit 209. The channel multiplexing unit 205 multiplexes a pilot channel generated by the pilot channel generating unit 201 and a data channel generated by the data channel generating unit 203. The scrambling code multiplying unit 207 multiplies the multiplexed channel with a sector-specific or mobile-station-specific scrambling code. The transmission timing adjusting unit 209 adjusts timings for transmitting signals based on transmission timing control information included in the signal from the base station so that the signals received at the base station are orthogonal in the time domain.

Second Embodiment

In a second embodiment, an approach for orthogonalizing signals from respective mobile stations in the code domain is described below. A base station 10 in accordance with the second embodiment is identical with the base station shown in FIG. 3 except that the radio resource allocating unit 113 generates code allocation information for each mobile station so that signals transmitted from the respective mobile stations are orthogonal in the code domain. The transmission signal generating units 109-1 through 109-3 transmit the code allocation information to each mobile station.

Figure 8:
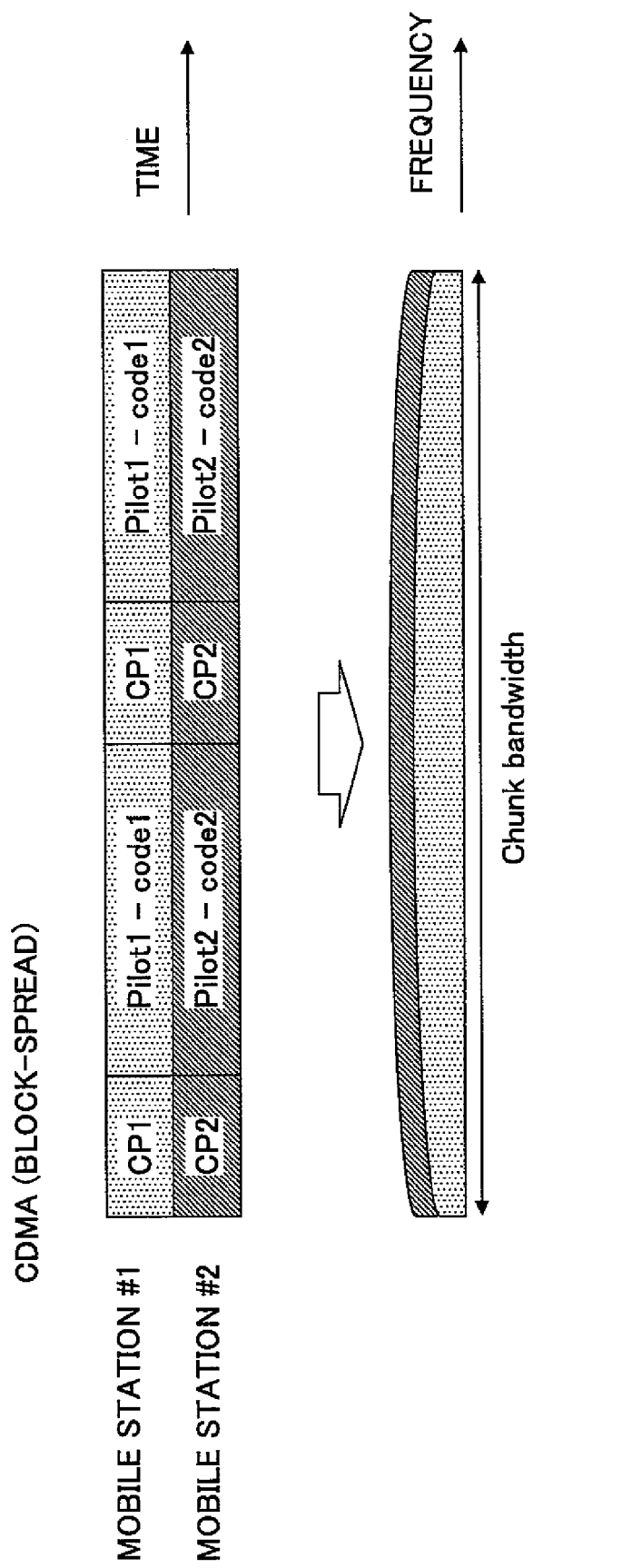
FIG. 8 shows a diagram illustrating orthogonality in the code domain at a base station in accordance with a second embodiment of the present invention.

FIG. 8 shows a diagram illustrating how signals (on pilot channels) from the respective mobile stations are orthogonal at the base station in the code domain. The technology called Block-Spread CDMA (Chip-Interleaved Block-Spread Code Division Multiple Access) can be used for multiplexing signals within guard intervals in the code domain. With Block-Spread CDMA, the pilot channel for the mobile station #1 and the pilot channel for the mobile station #2 do not interfere with each other in the code domain. This enables measurement of the propagation path condition with high accuracy. Compared to the conventional Direct Sequence CDMA, Block-Spread CDMA allows for orthogonalization with lower accuracy of transmission timing control due to guard intervals CP1 and CP2.

It should be noted that, other than Block-Spread CDMA, CAZAC (Constant Amplitude Zero Auto-Correlation) codes can be used for orthogonalizing signals in the code domain (for example, R. L. Frank and S. A. Zadoff, "Phase shift pulse codes with good periodic correlation properties," IEEE Trans. Inform. Theory, vol. IT-8, pp. 381-382, 1962. and D. C. Chu, "Polyphase codes with good periodic correlation properties," IEEE Trans. Inform. Theory, vol. IT-18, pp. 531-532, July 1972.).

Figure 9:
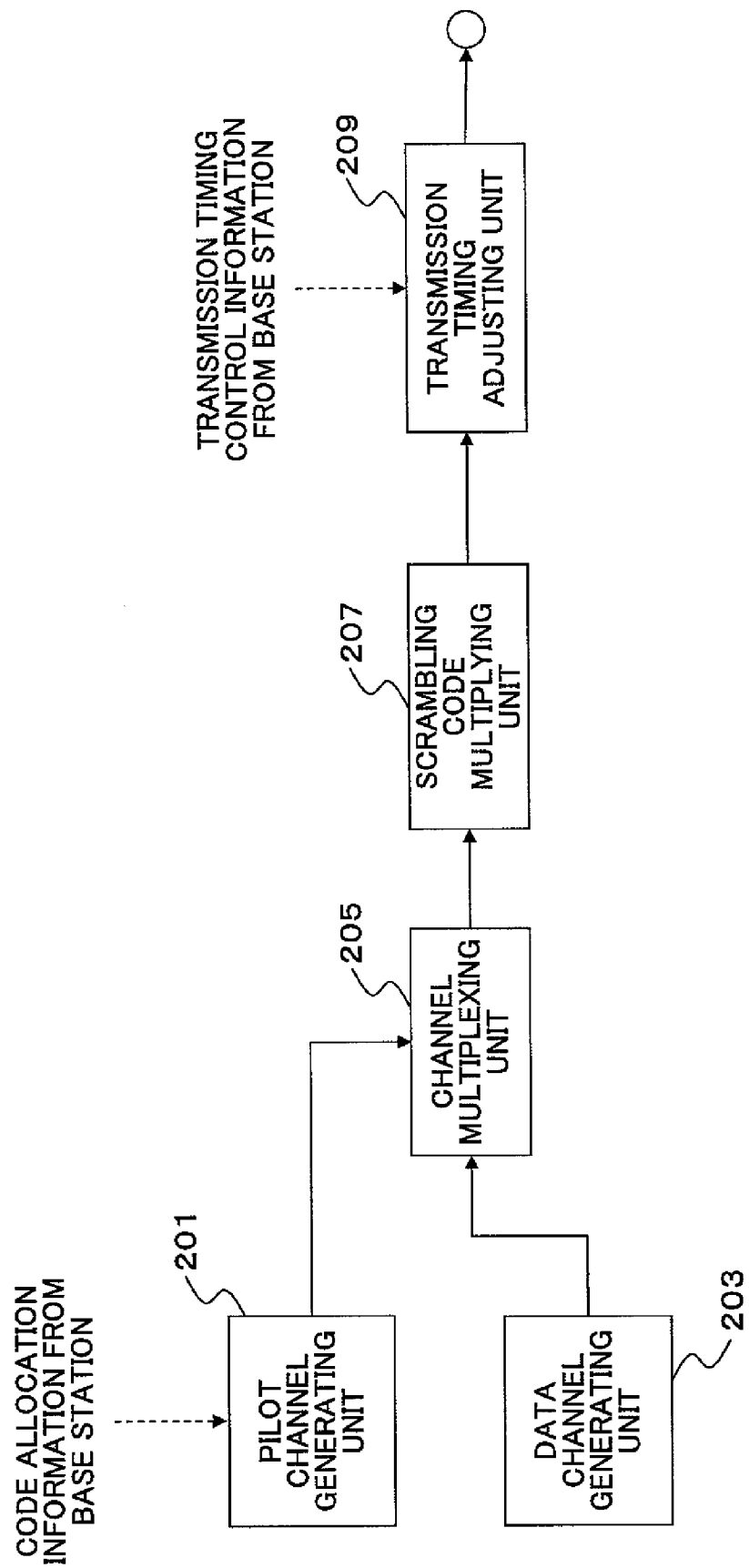
FIG. 9 shows a block diagram of a mobile station communicating with a base station in accordance with a second embodiment of the present invention.

FIG. 9 shows a block diagram of a mobile station 20 communicating with the base station 10. The mobile station 20 is identical with the mobile station shown in FIG. 7 except that the pilot channel generating unit 201 receives additional input information. The pilot channel generating unit 201 generates a pilot channel based on code allocation information included in the signal from the base station so that signals received at the base station are orthogonal in the code domain. The pilot channel is multiplexed with a data channel, and then multiplied with a sector-specific or mobile-station-specific scrambling code. The transmission timing adjusting unit 209 adjusts timings for transmitting signals based on transmission timing control information included in the signal from the base station so that the signals received at the base station are synchronized.

Third Embodiment

In a third embodiment, an approach for orthogonalizing signals from respective mobile stations in the frequency domain is described below. A base station 10 in accordance with the second embodiment is identical with the base station shown in FIG. 3 except for the operation in the radio resource allocating unit 113. The radio resource allocating unit 113 generates frequency allocation information for each mobile station so that signals transmitted from the respective mobile stations are orthogonal in the frequency domain. The transmission signal generating units 109-1 through 109-3 transmit the frequency allocation information to each mobile station.

Figure 10:
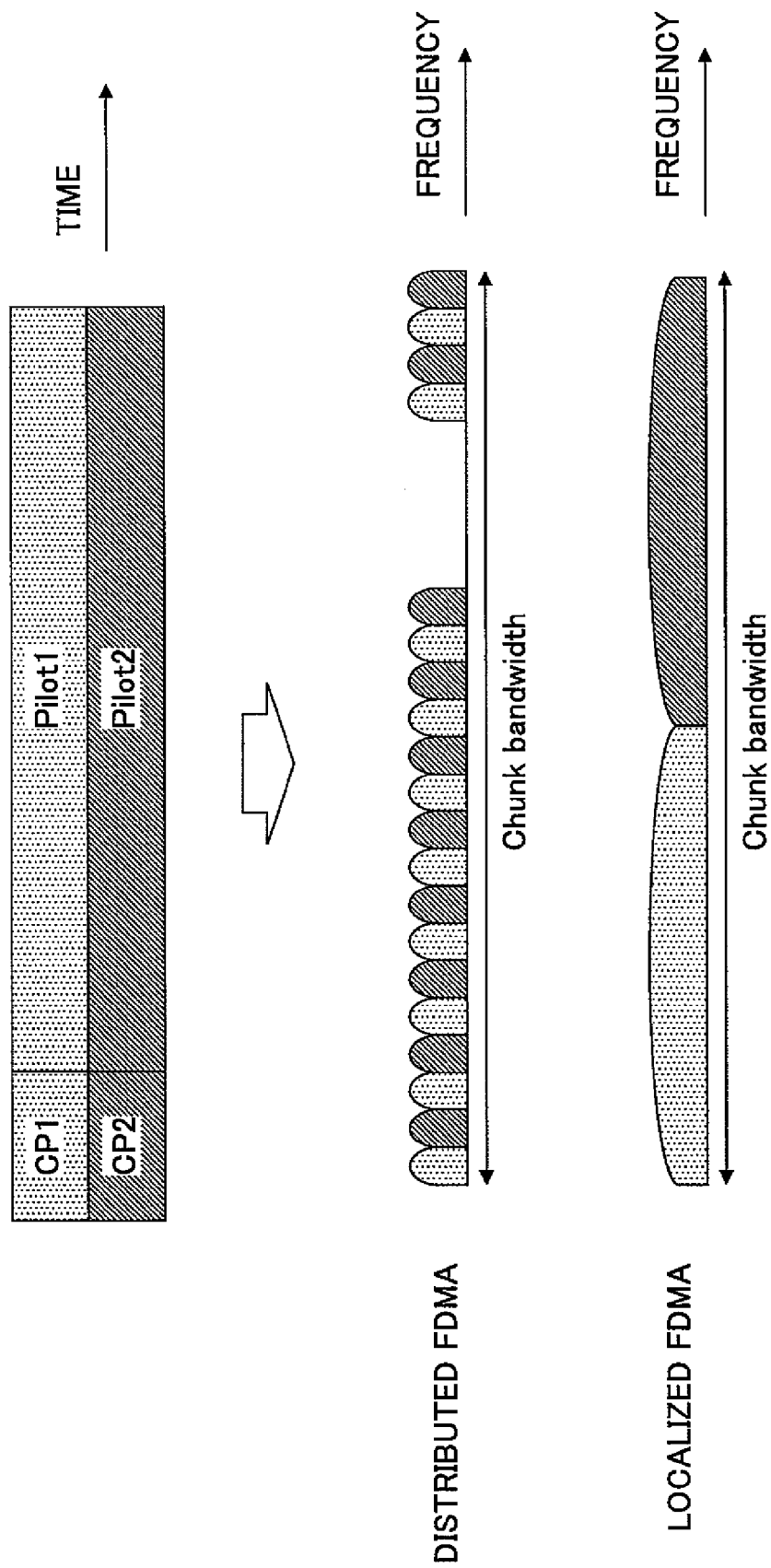
FIG. 10 shows a diagram illustrating orthogonality in the frequency domain at a base station in accordance with a third embodiment of the present invention.

FIG. 10 shows a diagram illustrating how signals (on pilot channels) from the respective mobile stations are orthogonal at the base station in the frequency domain. Distributed FDMA and Localized FDMA can be used for achieving orthogonalization in the frequency domain. In Distributed FDMA, frequency bands are allocated to the respective mobile stations with a comb-shaped frequency spectrum. The frequency spectrum in Distributed FDMA can be obtained by the technology called VSCRF-CDMA (Variable Spreading and Chip Repetition Factor-CDMA). In Localized FDMA, the total frequency band is divided by the number of mobile stations. In either case, the pilot channel for the mobile station #1 and the pilot channel for the mobile station #2 do not interfere with each other in the frequency domain. This enables measurement of the propagation path condition with high accuracy. Also, when guard intervals CP1 and CP2 are taken into consideration, orthogonalization is achieved with lower accuracy of transmission timing control.

Figure 11:
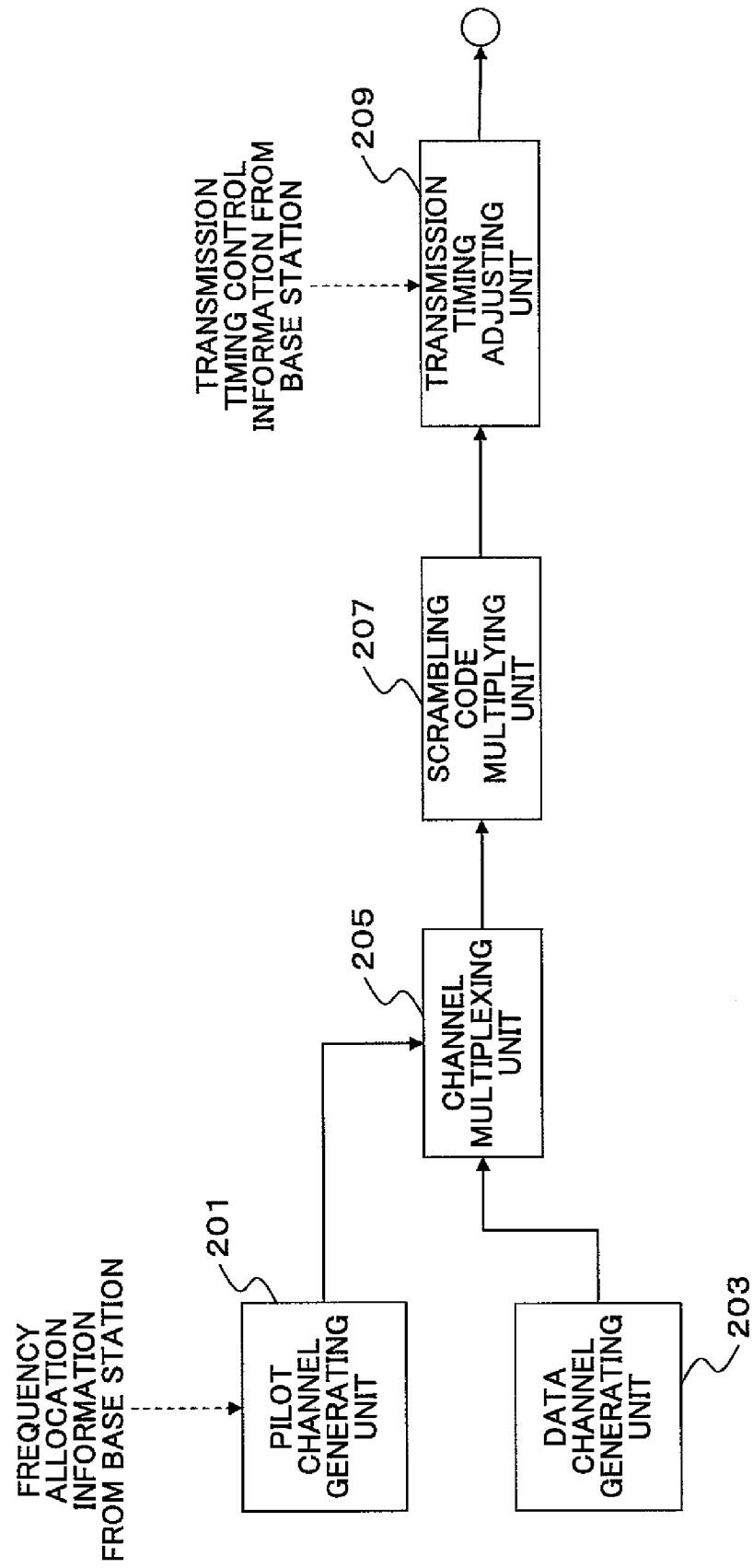
FIG. 11 shows a block diagram of a mobile station communicating with a base station in accordance with a third embodiment of the present invention.

FIG. 11 shows a block diagram of a mobile station 20 communicating with the base station 10. The mobile station 20 is identical with the mobile station shown in FIG. 7 except that the pilot channel generating unit 201 receives additional input information. The pilot channel generating unit 201 generates a pilot channel based on frequency allocation information included in the signal from the base station so that signals received at the base station are orthogonal in the frequency domain. The pilot channel is multiplexed with a data channel, and then multiplied with a sector-specific or mobile-station-specific scrambling code. The transmission timing adjusting unit 209 adjusts timings for transmitting signals based on transmission timing control information included in the signal from the base station so that the signals received at the base station are synchronized.

Figure 12:
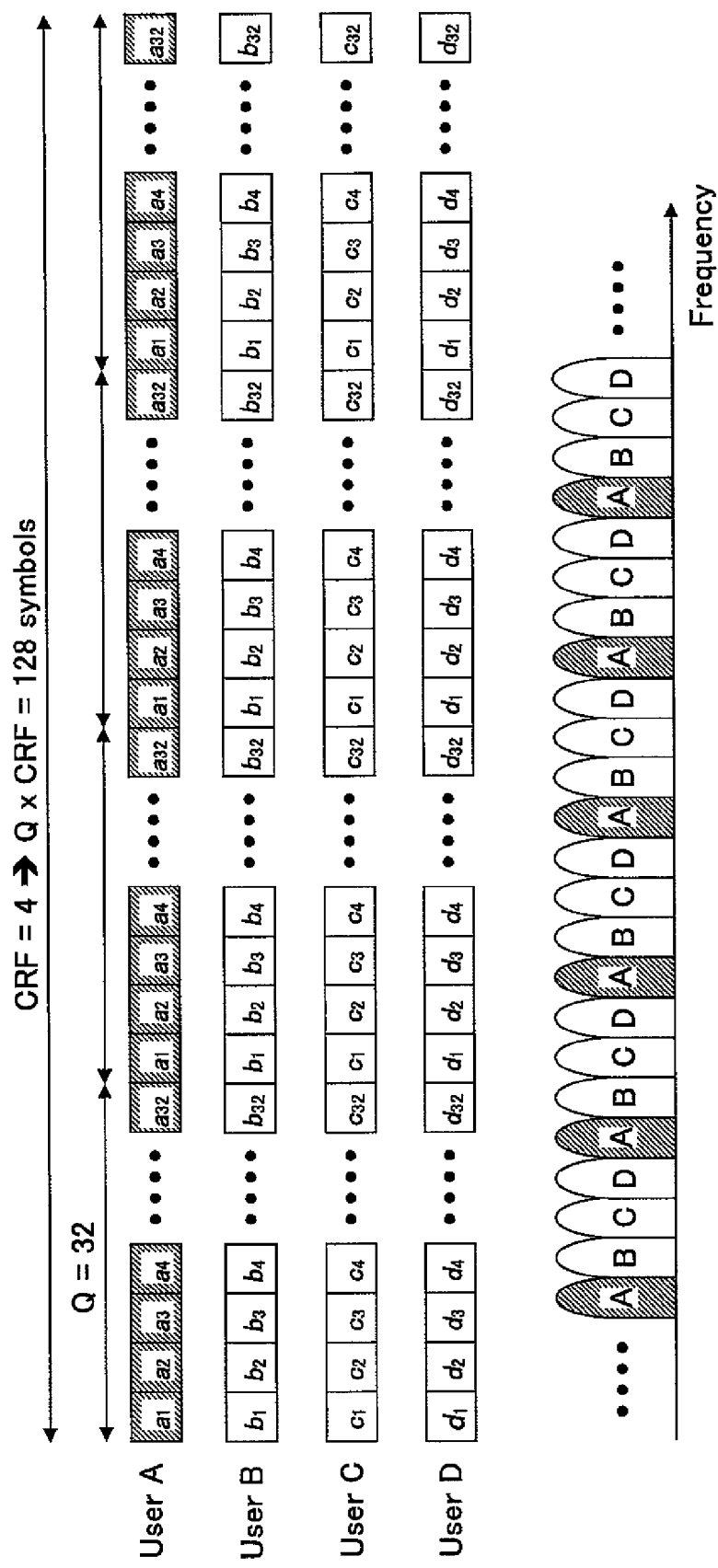
FIG. 12 shows a diagram illustrating orthogonality among multiple users (4 users) in accordance with a third embodiment of the present invention.
Figure 13:
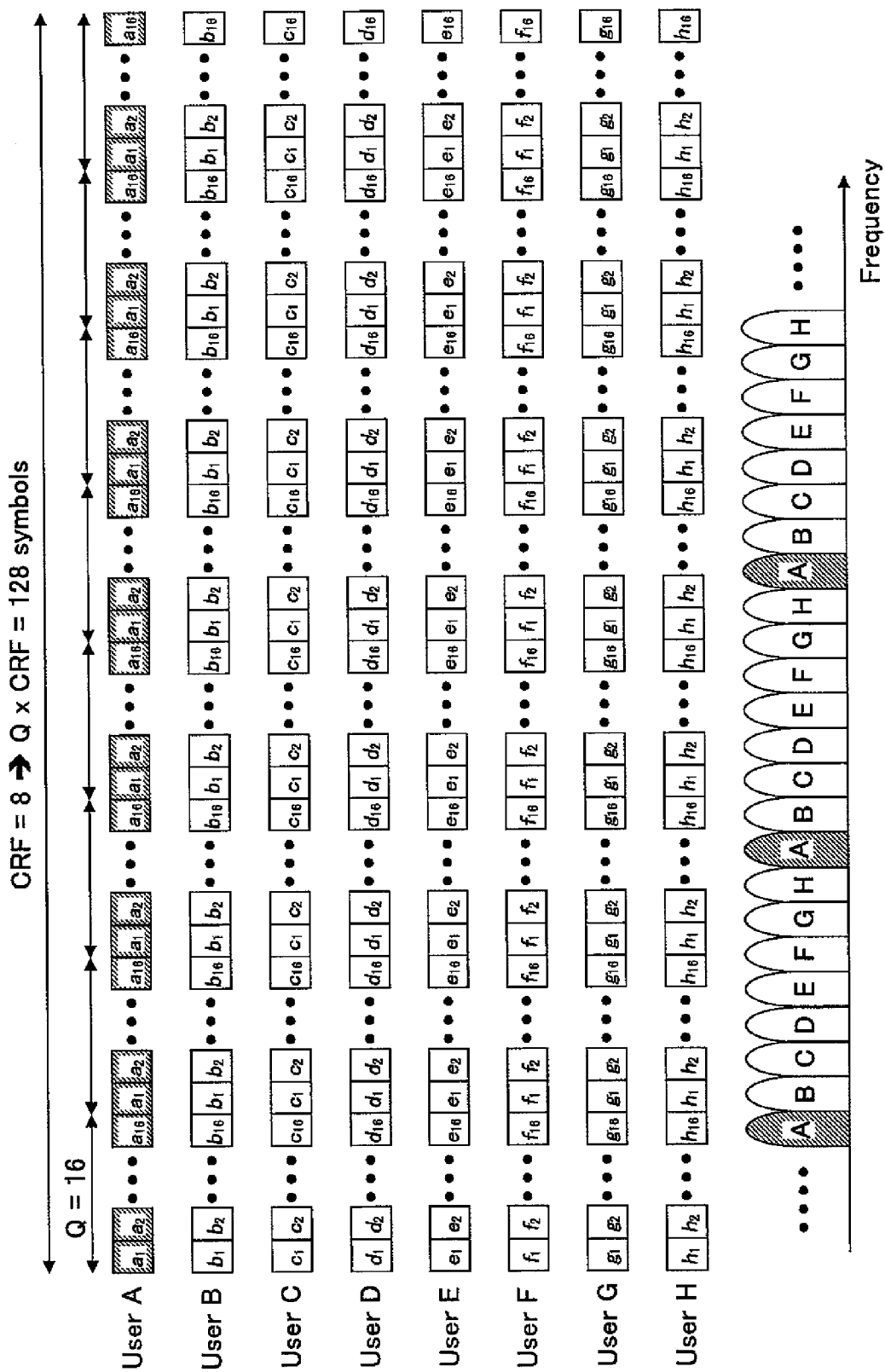
FIG. 13 shows a diagram illustrating orthogonality among multiple users (8 users) in accordance with a third embodiment of the present invention.

Although orthogonalization between two mobile stations is described in the third embodiment, the present invention is not limited to the predetermined number of mobile stations. For example, the present invention can be applicable to orthogonalization in the frequency domain among 4 users (4 mobile stations) as shown in FIG. 12 as well as among 8 users (8 mobile stations) as shown in FIG. 13. FIG. 12 shows the case where a frequency spectrum based on Distributed FDMA is generated by repeating 32 chips four times (Q=32, CRF=4). FIG. 13 shows the case where a frequency spectrum based on Distributed FDMA is generated by repeating 16 chips eight times (Q=16, CRF=8).

Fourth Embodiment

In the case where the base station and the mobile stations perform MIMO (Multi-Input Multi-Output) transmission, an approach for orthogonalizing signals from the respective mobile stations is described below.

Figure 14:
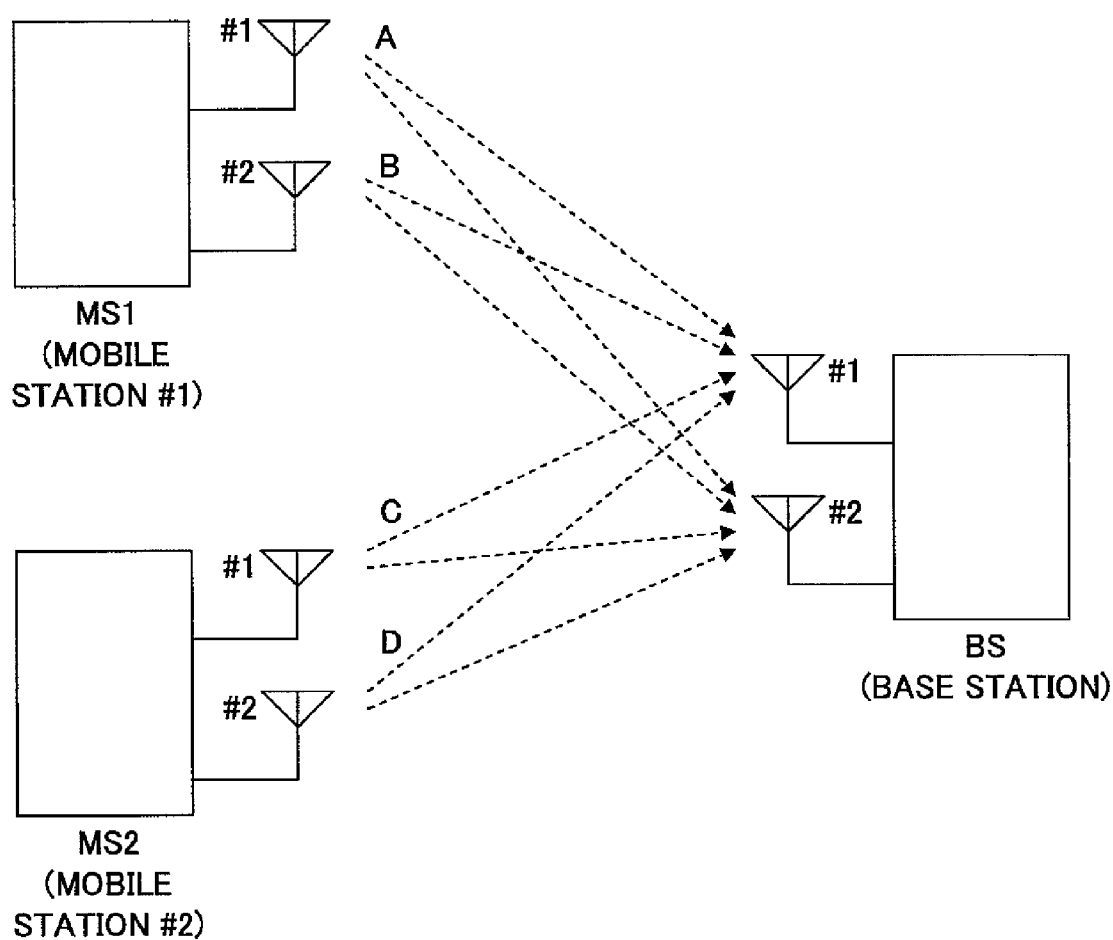
FIG. 14 shows an example of a communication system employing MIMO transmission.

FIG. 14 shows an example of a communication system in accordance with MIMO transmission. Each mobile station #1, #2 (MS1, MS2) includes two antennas #1 and #2 and a base station (BS) includes two antennas #1 and #2. In MIMO transmission, transmission timing control has to be performed to orthogonalize pilot channels from the respective antennas in addition to orthogonalizing pilot channels from the mobile stations. Specifically, the base station performs transmission timing control so that a signal A transmitted from the antenna #1 in the mobile station #1, a signal B transmitted from the antenna #2 in the mobile station #1, a signal C transmitted from the antenna #1 in the mobile station #2, and a signal D transmitted from the antenna #2 in the mobile station #2 are mutually orthogonal. In order to orthogonalize signals from the respective antennas, the base station can allocate orthogonal radio resources in the time, frequency, or code domain. This resource allocation can reduce multiple-access interference.

Although embodiments are described below in terms of two antennas, the present invention is applicable to MIMO transmission by means of any number of antennas (M-port inputs and N-port outputs).

Figure 15:
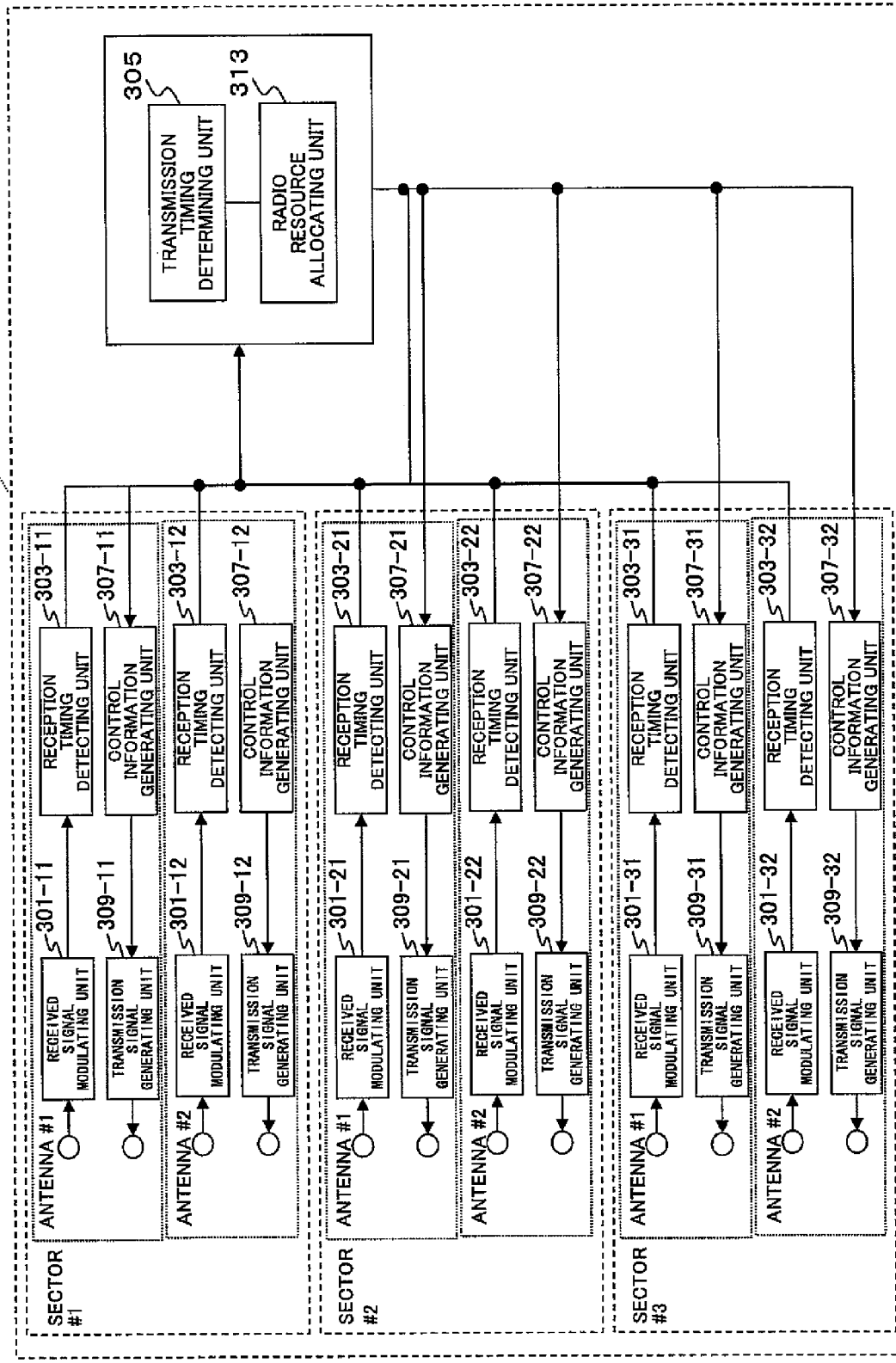
FIG. 15 shows a block diagram of a base station in accordance with fourth through ninth embodiments of the present invention.

FIG. 15 shows a block diagram of a base station 30 in accordance with a fourth embodiment of the present invention. In the fourth embodiment, an approach for orthogonalizing signals from respective antennas in the time domain in addition to orthogonalizing signals from respective mobile stations in the time domain is described below.

The base station 30 includes received signal modulation units 301-11 through 301-32, reception timing detecting units 303-11 through 303-32, control information generating units 307-11 through 307-32, and transmission signal generating units 309-11 through 309-32 for each antenna. The base station 30 further includes a transmission timing determining unit 305 and a radio resource allocating unit 313. The received signal modulation units 301-11 through 301-32 modulate signals received from the mobile stations at the respective antennas. The reception timing detecting units 303-11 through 303-32 detect reception timings of the received signals and provide reception timing information to the transmission timing determining unit 305. The transmission timing determining unit 305 measures a reception timing difference based on reception timing information for each antenna in each mobile station within all sectors in the base station. The transmission timing determining unit 305 calculates transmission timings so that signals transmitted from the respective antennas in the respective mobile stations are synchronized within a guard interval. The radio resource allocating unit 313 generates radio resource allocation information for each mobile station so that signals transmitted from the respective antennas in the respective mobile stations are orthogonal in the time domain. The control information generating units 307-11 through 307-32 generate transmission timing control information for the corresponding mobile stations based on the calculated transmission timings and the radio resource allocation information. The transmission signal generating units 309-11 through 309-32 generate transmission signals for the corresponding mobile stations. The corresponding transmission signal is transmitted to each mobile station.

Figure 16:
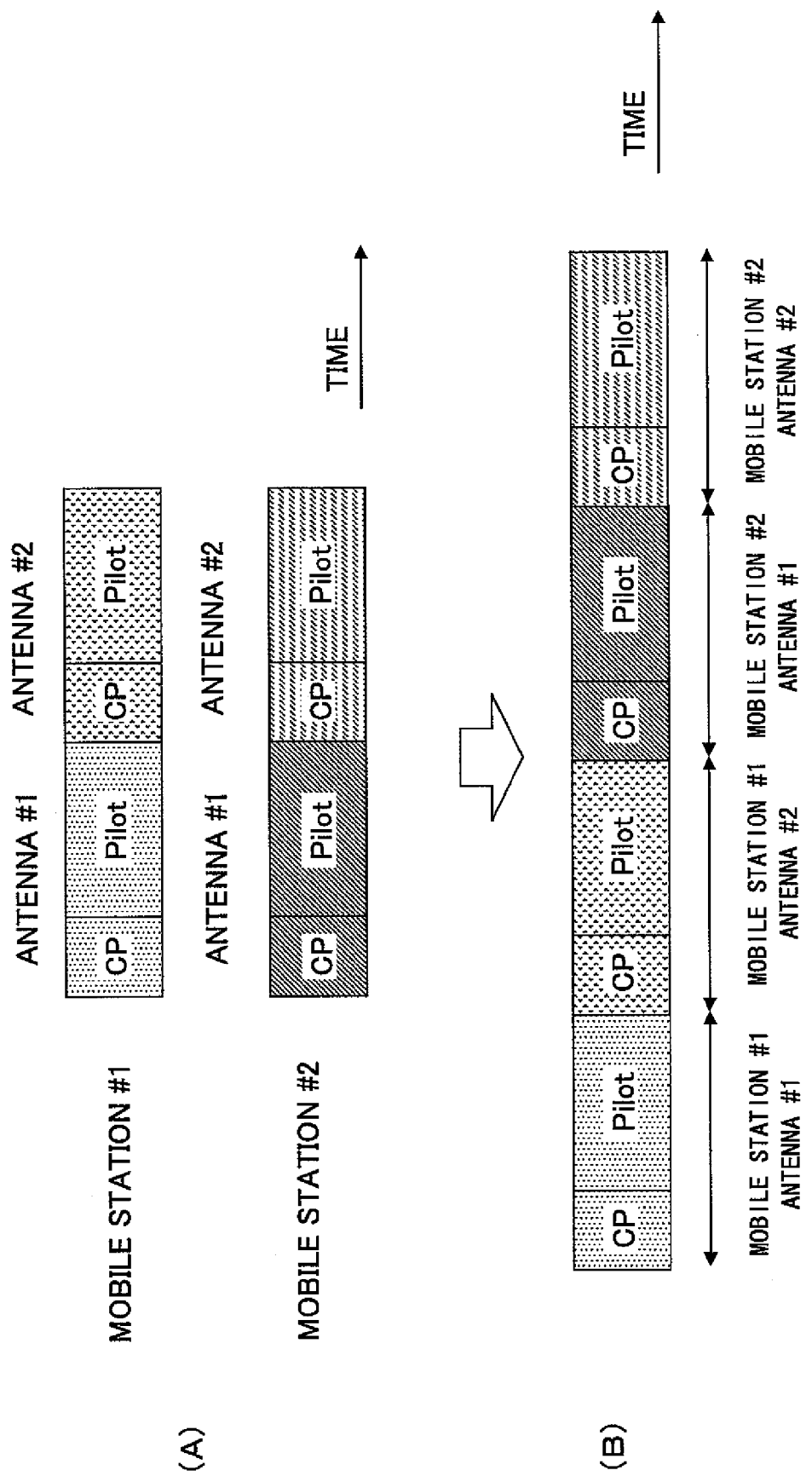
FIG. 16 shows a diagram illustrating orthogonality at a base station in accordance with the fourth embodiment of the present invention (orthogolality in the time domain among mobile stations; orthogonality in the time domain among antennas).

FIG. 16 shows a diagram illustrating how signals from the respective antennas are orthogonal at the base station in the time domain in addition to how signals from the respective mobile stations are orthogonal at the base station in the time domain.

As shown in FIG. 16(A), pilot channels from the respective antennas in the mobile station #1 or #2 can be orthogonalized in the time domain. As mentioned above, timing errors may occur within guard intervals (CPs). In addition, as shown in FIG. 16(B), the pilot channels orthogonalized among the respective antennas in the time domain can be further orthogonalized among the mobile stations #1 and #2 in the time domain. Consequently, the four pilot channels from the two antennas in the mobile station #1 and the two antennas in the mobile station #2 do not interfere with each other on the time axis. Therefore, interference from the respective antennas can be reduced in MIMO transmission, and thus communication quality can be improved.

Figure 17:
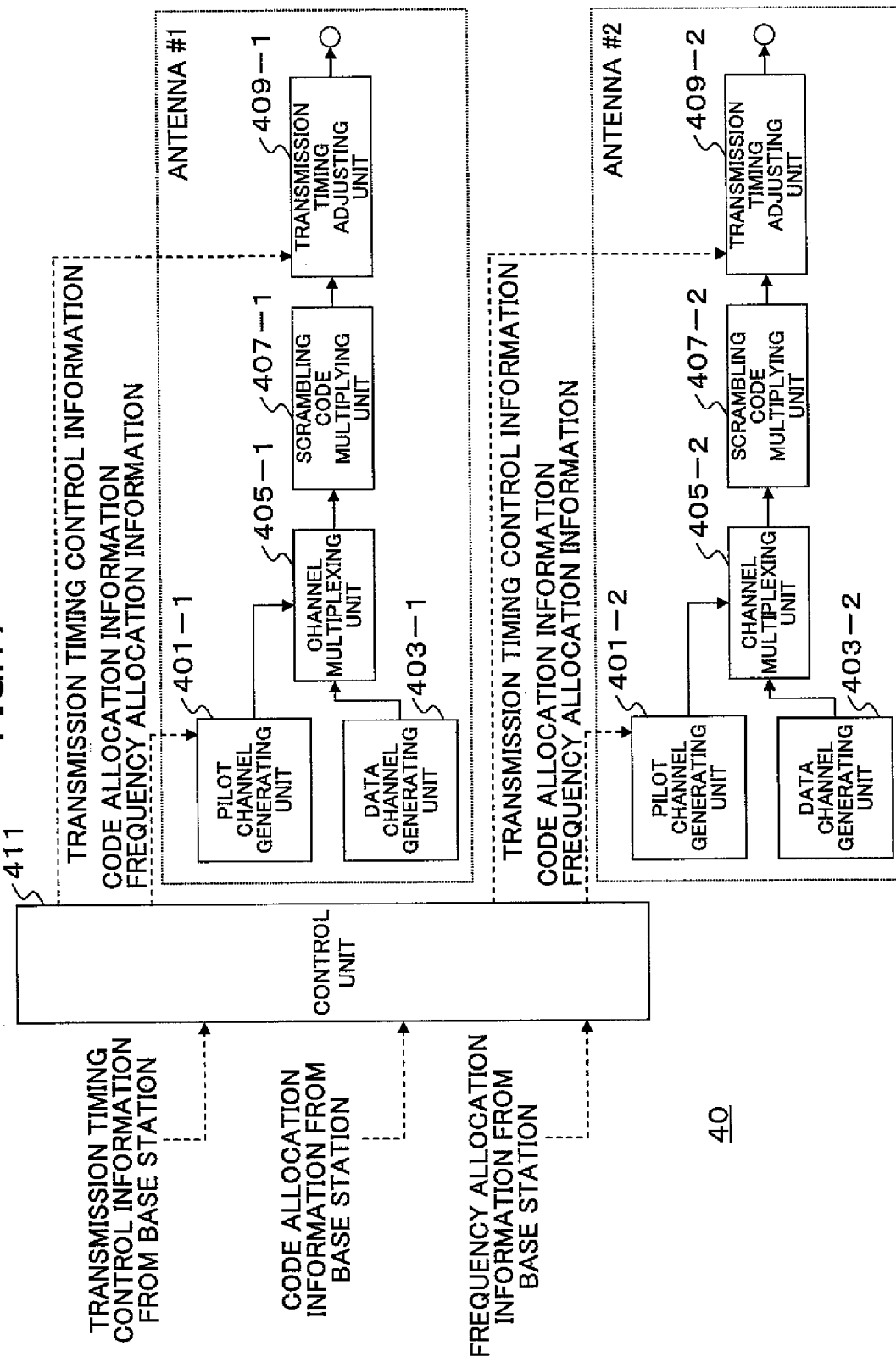
FIG. 17 shows a block diagram of a mobile station communicating with a base station in accordance with the fourth through ninth embodiments of the present invention.

FIG. 17 shows a block diagram of a mobile station 40 communicating with the base station 30. The mobile station 40 includes pilot channel generating units 401-1 through 401-2, data channel generating units 403-1 through 403-2 (as used herein, the data channel generating units 403-1 through 403-2 include the capability of generating a control channel), channel multiplexing units 405-1 through 405-2, scrambling code multiplying units 407-1 through 407-2, and transmission timing adjusting units 409-1 through 409-2 for each antenna. These units act in the same way as the units shown in FIGS. 7, 9, and 11. The mobile station 40 further includes a control unit 411 for providing transmission timing control information received from the base station to the transmission timing adjusting units 409-1 through 409-2 (code allocation information and frequency allocation information in FIG. 17 are described below). Specifically, the control unit 411 receives transmission timing control information from the base station and distributes the transmission timing control information to the transmission timing adjusting units 409-1 through 409-2 for the respective antennas, so that the signals received at the base station are orthogonal in the time domain.

Fifth Embodiment

In a fifth embodiment, an approach for orthogonalizing signals from respective antennas in the code domain in addition to orthogonalizing signals from respective mobile stations in the time domain is described below. A base station 30 in accordance with the fifth embodiment can be arranged as shown in FIG. 15. The transmission timing determining unit 305 determines transmission timings so that pilot channels are orthogonal among the mobile stations in the time domain. The radio resource allocating unit 313 generates code allocation information for each mobile station so that pilot channels are orthogonal among the antennas in the code domain. The code allocation information is transmitted from the transmission signal generating units 309-11 through 309-32 to each mobile station.

Figure 18:
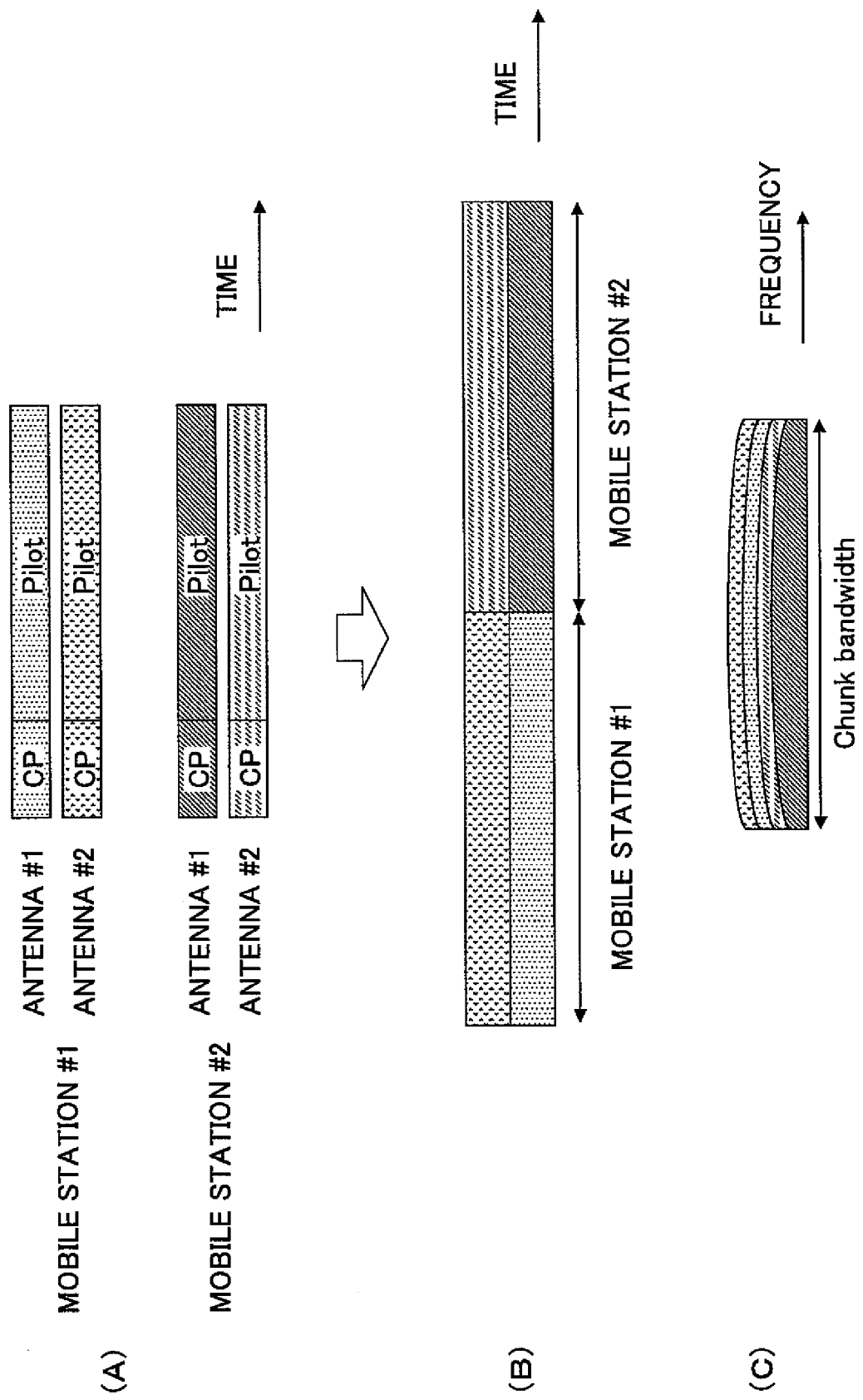
FIG. 18 shows a diagram illustrating orthogonality at a base station in accordance with the fifth embodiment of the present invention (orthogolality in the time domain among mobile stations; orthogonality in the code domain among antennas).

FIG. 18 shows a diagram illustrating how signals from the respective antennas are orthogonal at the base station in the code domain in addition to how signals from the respective mobile stations are orthogonal at the base station in the time domain. As shown in FIG. 18(A), pilot channels from the respective antennas in the mobile station #1 or #2 can be orthogonalized in the code domain. In addition, as shown in FIG. 18(B), the pilot channels orthogonalized among the respective antennas in the code domain can be further orthogonalized among the mobile stations #1 and #2 in the time domain. Consequently, the four pilot channels from the two antennas in the mobile station #1 and the two antennas in the mobile station #2 do not interfere with each other. Specifically, pilot channels among the mobile stations do not interfere with each other on the time axis as shown in FIG. 18(B), and pilot channels among the antennas do not interfere with each other in the code domain as shown in FIG. 18(C).

With reference to FIG. 17, a mobile station 40 in accordance with the fifth embodiment is described below. In the fifth embodiment, the control unit 411 in the mobile station 40 receives code allocation information generated by the radio resource allocating unit 313 in the base station 30, in addition to transmission timing control information from the base station 30. The control unit 411 distributes the code allocation information to the pilot channel generating units 401-1 through 401-2 for the respective antennas, so that the signals received at the base station are orthogonal among the antennas in the code domain. The control unit 411 further distributes the transmission timing control information to the transmission timing adjusting units 409-1 through 409-2 for the respective antennas, so that the signals received at the base station are orthogonal among the mobile stations in the time domain.

Sixth Embodiment

In a sixth embodiment, an approach for orthogonalizing signals from respective antennas in the frequency domain in addition to orthogonalizing signals from respective mobile stations in the time domain is described below. A base station 30 in accordance with the sixth embodiment can be arranged as shown in FIG. 15. The transmission timing determining unit 305 determines transmission timings so that pilot channels are orthogonal among the mobile stations in the time domain. The radio resource allocating unit 313 generates frequency allocation information for each mobile station so that pilot channels are orthogonal among the antennas in the frequency domain. The frequency allocation information is transmitted from the transmission signal generating units 309-11 through 309-32 to each mobile station.

Figure 19:
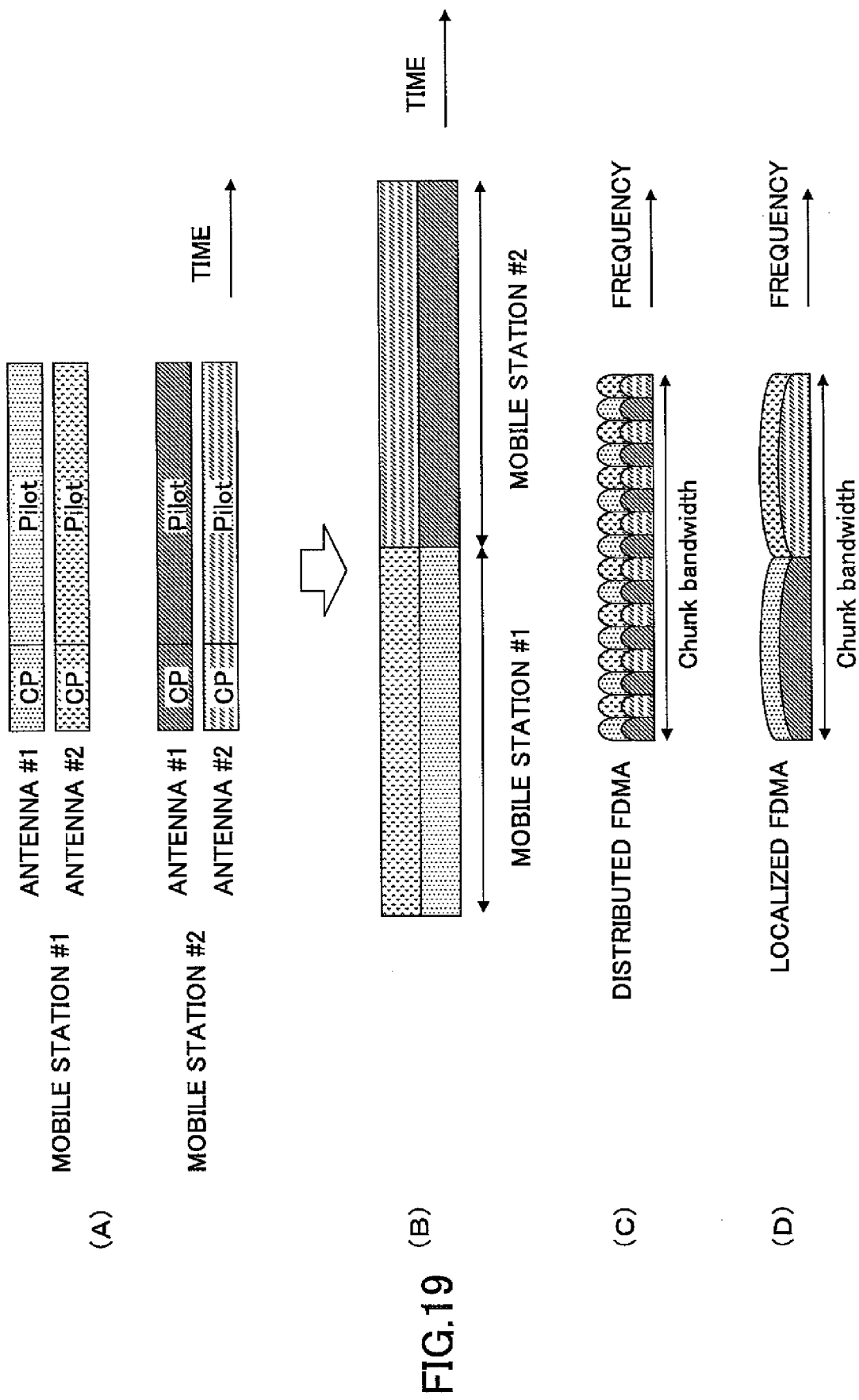
FIG. 19 shows a diagram illustrating orthogonality at a base station in accordance with the sixth embodiment of the present invention (orthogolality in the time domain among mobile stations; orthogonality in the frequency domain among antennas).

FIG. 19 shows a diagram illustrating how signals from the respective antennas are orthogonal at the base station in the frequency domain in addition to how signals from the respective mobile stations are orthogonal at the base station in the time domain. As shown in FIG. 19(A), pilot channels from the respective antennas in the mobile station #1 or #2 can be orthogonalized in the frequency domain. In addition, as shown in FIG. 19(B), the pilot channels orthogonalized among the respective antennas in the frequency domain can be further orthogonalized among the mobile stations #1 and #2 in the time domain. Consequently, the four pilot channels from the two antennas in the mobile station #1 and the two antennas in the mobile station #2 do not interfere with each other. Specifically, pilot channels among the mobile stations do not interfere with each other on the time axis as shown in FIG. 19(B), and pilot channels among the antennas do not interfere with each other in the frequency domain as shown in FIGS. 19(C) and (D).

With reference to FIG. 17, a mobile station 40 in accordance with the sixth embodiment is described below. In the sixth embodiment, the control unit 411 in the mobile station 40 receives frequency allocation information generated by the radio resource allocating unit 313 in the base station 30, in addition to transmission timing control information from the base station 30. The control unit 411 distributes the frequency allocation information to the pilot channel generating units 401-1 through 401-2 for the respective antennas, so that the signals received at the base station are orthogonal among the antennas in the frequency domain. The control unit 411 further distributes the transmission timing control information to the transmission timing adjusting units 409-1 through 409-2 for the respective antennas, so that the signals received at the base station are orthogonal among the mobile stations in the time domain.

Seventh Embodiment

In a seventh embodiment, an approach for orthogonalizing signals from respective antennas in the time domain in addition to orthogonalizing signals from respective mobile stations in the code domain is described below. A base station 30 in accordance with the seventh embodiment can be arranged as shown in FIG. 15. The transmission timing determining unit 305 determines transmission timings so that pilot channels are orthogonal among the antennas in the time domain. The radio resource allocating unit 313 generates code allocation information for each mobile station so that pilot channels are orthogonal among the mobile stations in the code domain. The code allocation information is transmitted from the transmission signal generating units 309-11 through 309-32 to each mobile station.

Figure 20:
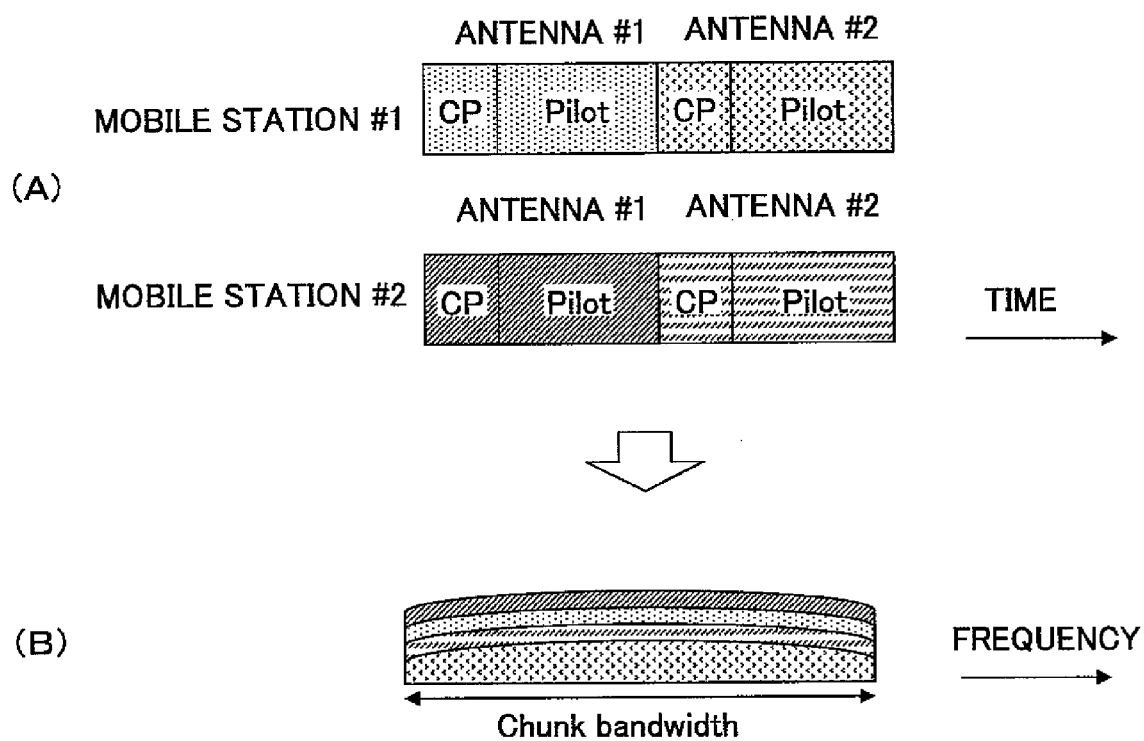
FIG. 20 shows a diagram illustrating orthogonality at a base station in accordance with the seventh embodiment of the present invention (orthogolality in the code domain among mobile stations; orthogonality in the time domain among antennas).

FIG. 20 shows a diagram illustrating how signals from the respective antennas are orthogonal at the base station in the time domain in addition to how signals from the respective mobile stations are orthogonal at the base station in the code domain. As shown in FIG. 20(A), the pilot channels orthogonalized among the respective antennas in the time domain can be orthogonalized among the mobile stations #1 and #2 in the code domain. Consequently, pilot channels among the antennas do not interfere with each other on the time axis as shown in FIG. 20(A), and pilot channels among the mobile stations do not interfere with each other in the code domain as shown in FIG. 20(B).

With reference to FIG. 17, a mobile station 40 in accordance with the seventh embodiment is described below. In the seventh embodiment, the control unit 411 in the mobile station 40 receives code allocation information generated by the radio resource allocating unit 313 in the base station 30, in addition to transmission timing control information from the base station 30. The control unit 411 distributes the code allocation information to the pilot channel generating units 401-1 through 401-2 for the respective antennas, so that the signals received at the base station are orthogonal among the mobile stations in the code domain. The control unit 411 further distributes the transmission timing control information to the transmission timing adjusting units 409-1 through 409-2 for the respective antennas, so that the signals received at the base station are orthogonal among the antennas in the time domain.

Eighth Embodiment

In an eighth embodiment, an approach for orthogonalizing signals from respective antennas in the code domain in addition to orthogonalizing signals from respective mobile stations in the code domain is described below. A base station 30 in accordance with the eighth embodiment can be arranged as shown in FIG. 15. The radio resource allocating unit 313 generates code allocation information for each mobile station so that pilot channels are orthogonal both among the mobile stations and among the antennas in the code domain. The code allocation information is transmitted from the transmission signal generating units 309-11 through 309-32 to each mobile station.

Figure 21:
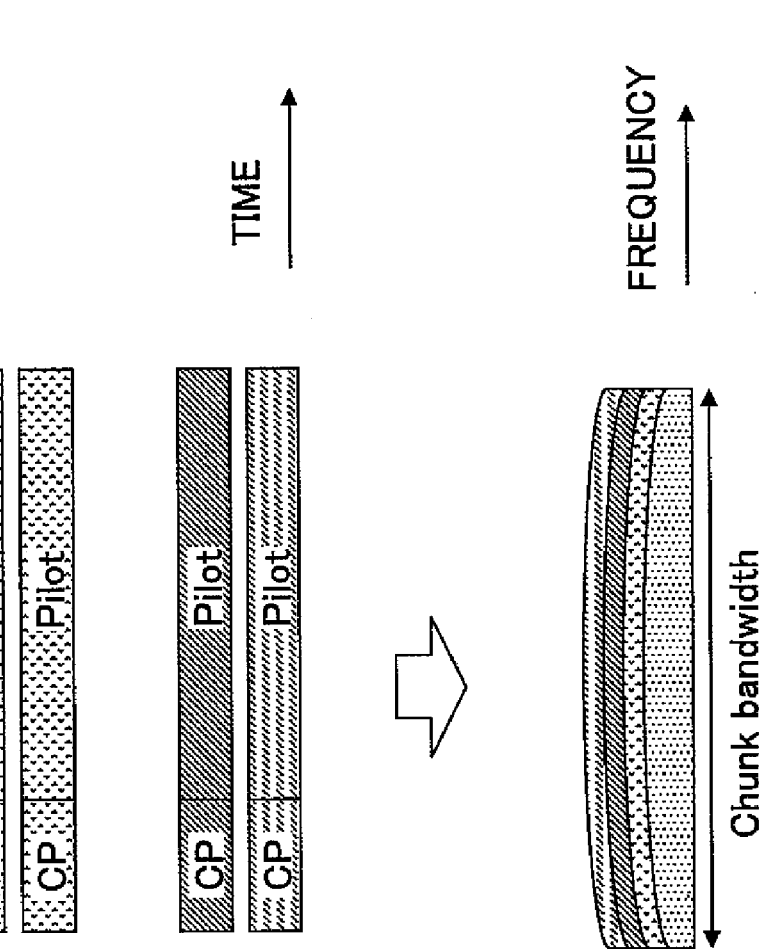
FIG. 21 shows a diagram illustrating orthogonality at a base station in accordance with the eighth embodiment of the present invention (orthogolality in the code domain among mobile stations; orthogonality in the code domain among antennas).

FIG. 21 shows a diagram illustrating how signals from the respective antennas are orthogonal at the base station in the code domain in addition to how signals from the respective mobile stations are orthogonal at the base station in the code domain. As shown in FIG. 21(A), the pilot channels from the respective antennas in the mobile stations #1 and #2 can be orthogonalized with each other in the code domain. Consequently, pilot channels both among the base stations and among the antennas do not interfere with each other in the code domain as shown in FIG. 21(B).

With reference to FIG. 17, a mobile station 40 in accordance with the eighth embodiment is described below. In the eighth embodiment, the control unit 411 in the mobile station 40 receives code allocation information generated by the radio resource allocating unit 313 in the base station 30. The control unit 411 distributes the code allocation information to the pilot channel generating units 401-1 through 401-2 for the respective antennas, so that the signals received at the base station are orthogonal both among the mobile stations and among the antennas in the code domain.

Ninth Embodiment

In a ninth embodiment, an approach for orthogonalizing signals from respective antennas in the frequency domain in addition to orthogonalizing signals from respective mobile stations in the code domain is described below. A base station 30 in accordance with the ninth embodiment can be arranged as shown in FIG. 15. The radio resource allocating unit 313 generates code allocation information and frequency allocation information for each mobile station, so that pilot channels are orthogonal among the mobile stations in the code domain and are orthogonal among the antennas in the frequency domain. The code allocation information and the frequency allocation information are transmitted from the transmission signal generating units 309-11 through 309-32 to each mobile station.

Figure 22:
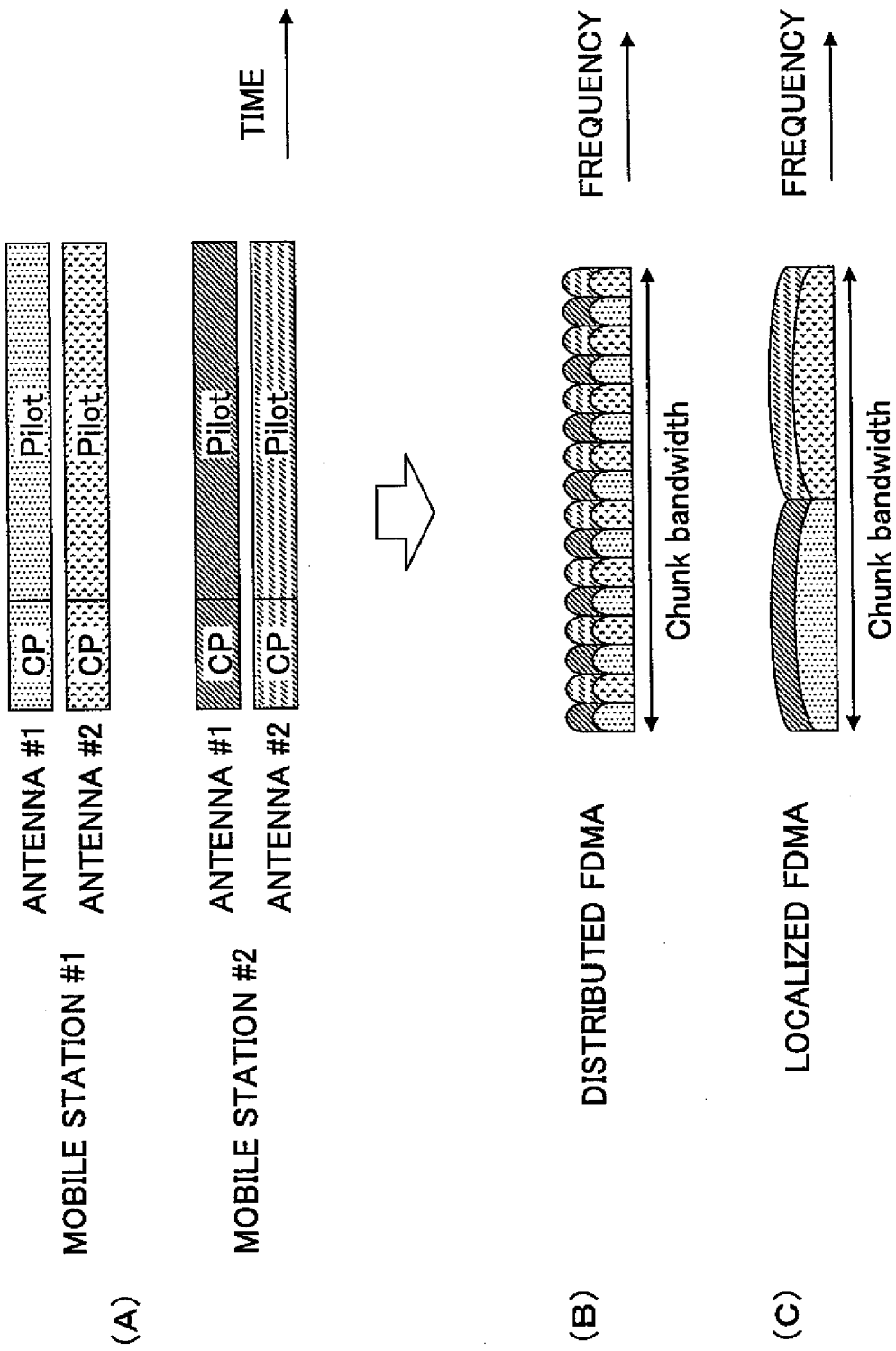
FIG. 22 shows a diagram illustrating orthogonality at a base station in accordance with the ninth embodiment of the present invention (orthogolality in the code domain among mobile stations; orthogonality in the frequency domain among antennas).

FIG. 22 shows a diagram illustrating how signals from the respective antennas are orthogonal at the base station in the frequency domain in addition to how signals from the respective mobile stations are orthogonal at the base station in the code domain. As shown in FIG. 22(A), the pilot channels orthogonalized among the respective mobile stations #1 and #2 in the code domain can be orthogonalized among the antennas in the frequency domain. Consequently, pilot channels among the mobile stations do not interfere with each other in the code domain, and pilot channels among the antennas do not interfere with each other in the frequency domain, as shown in FIG. 22(B) and FIG. 22(C).

With reference to FIG. 17, a mobile station 40 in accordance with the ninth embodiment is described below. In the ninth embodiment, the control unit 411 in the mobile station 40 receives code allocation information and frequency allocation information generated by the radio resource allocating unit 313 in the base station 30. The control unit 411 distributes the code allocation information and the frequency allocation information to the pilot channel generating units 401-1 through 401-2 for the respective antennas, so that the signals received at the base station are orthogonal among the mobile stations in the code domain and are orthogonal among the antennas in the frequency domain.

Tenth Embodiment

In a tenth embodiment, an approach for orthogonalizing signals from respective antennas in the time domain in addition to orthogonalizing signals from respective mobile stations in the frequency domain is described below. A base station 30 in accordance with the tenth embodiment can be arranged as shown in FIG. 15. The transmission timing determining unit 305 determines transmission timings so that pilot channels are orthogonal among the antennas in the time domain. The radio resource allocating unit 313 generates frequency allocation information for each mobile station so that pilot channels are orthogonal among the mobile stations in the frequency domain. The frequency allocation information is transmitted from the transmission signal generating units 309-11 through 309-32 to each mobile station.

Figure 23:
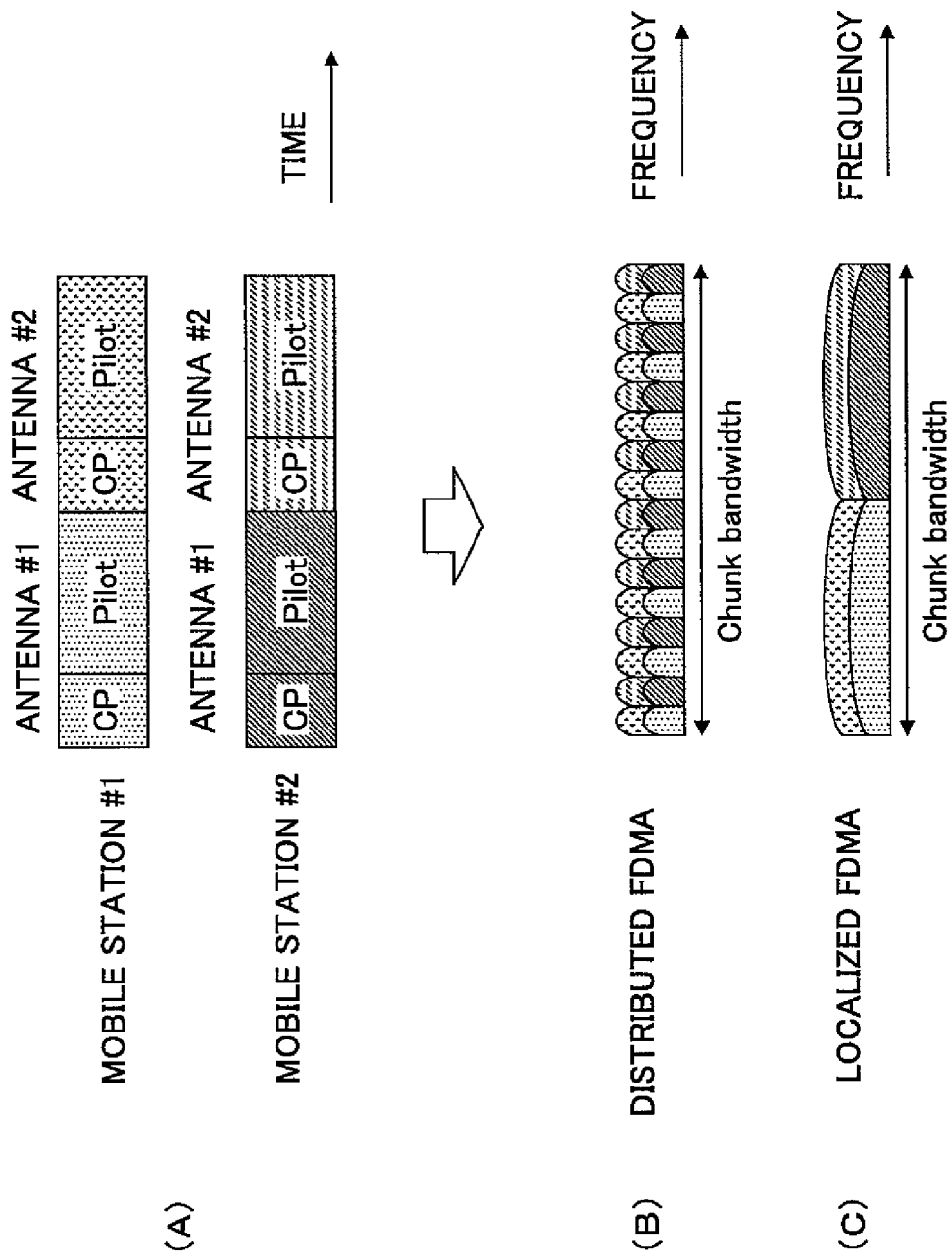
FIG. 23 shows a diagram illustrating orthogonality at a base station in accordance with a tenth embodiment of the present invention (orthogolality in the frequency domain among mobile stations; orthogonality in the time domain among antennas).

FIG. 23 shows a diagram illustrating how signals from the respective antennas are orthogonal at the base station in the time domain in addition to how signals from the respective mobile stations are orthogonal at the base station in the frequency domain. As shown in FIG. 23(A), the pilot channels orthogonalized among the respective antennas in the time domain can be orthogonalized among the mobile stations #1 and #2 in the frequency domain. Consequently, pilot channels among the antennas do not interfere with each other on the time axis, and pilot channels among the mobile stations do not interfere with each other in the frequency domain as shown in FIG. 23(B) and FIG. 23(C).

With reference to FIG. 17, a mobile station 40 in accordance with the tenth embodiment is described below. In the tenth embodiment, the control unit 411 in the mobile station 40 receives frequency allocation information generated by the radio resource allocating unit 313 in the base station 30, in addition to transmission timing control information from the base station 30. The control unit 411 distributes the frequency allocation information to the pilot channel generating units 401-1 through 401-2 for the respective antennas, so that the signals received at the base station are orthogonal among the mobile stations in the frequency domain. The control unit 411 further distributes the transmission timing control information to the transmission timing adjusting units 409-1 through 409-2 for the respective antennas, so that the signals received at the base station are orthogonal among the antennas in the time domain.

Eleventh Embodiment

In an eleventh embodiment, an approach for orthogonalizing signals from respective antennas in the code domain in addition to orthogonalizing signals from respective mobile stations in the frequency domain is described below. A base station 30 in accordance with the eleventh embodiment can be arranged as shown in FIG. 15. The radio resource allocating unit 313 generates frequency allocation information and code allocation information for each mobile station, so that pilot channels are orthogonal among the mobile stations in the frequency domain and are orthogonal among the antennas in the code domain. The frequency allocation information and the code allocation information are transmitted from the transmission signal generating units 309-11 through 309-32 to each mobile station.

Figure 24:
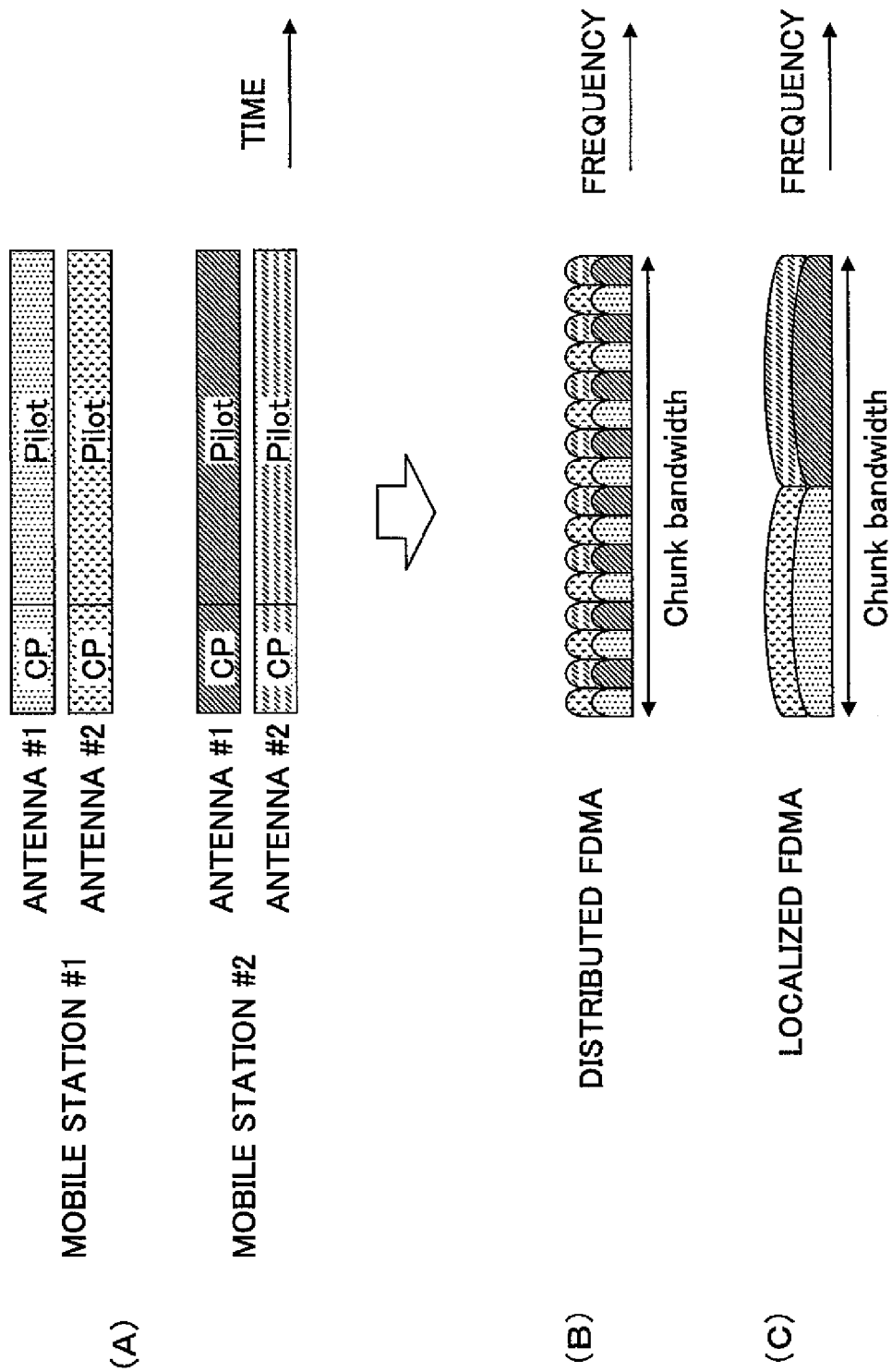
FIG. 24 shows a diagram illustrating orthogonality at a base station in accordance with an eleventh embodiment of the present invention (orthogolality in the frequency domain among mobile stations; orthogonality in the code domain among antennas).

FIG. 24 shows a diagram illustrating how signals from the respective antennas are orthogonal at the base station in the code domain in addition to how signals from the respective mobile stations are orthogonal at the base station in the frequency domain. As shown in FIG. 24(A), the pilot channels orthogonalized among the respective mobile stations #1 and #2 in the frequency domain can be orthogonalized among the antennas in the code domain. Consequently, pilot channels among the mobile stations do not interfere with each other in the frequency domain, and pilot channels among the antennas do not interfere with each other in the code domain, as shown in FIG. 24(B) and FIG. 24(C).

With reference to FIG. 17, a mobile station 40 in accordance with the eleventh embodiment is described below. In the eleventh embodiment, the control unit 411 in the mobile station 40 receives frequency allocation information and code allocation information generated by the radio resource allocating unit 313 in the base station 30. The control unit 411 distributes the frequency allocation information and the code allocation information to the pilot channel generating units 401-1 through 401-2 for the respective antennas, so that the signals received at the base station are orthogonal among the mobile stations in the frequency domain and are orthogonal among the antennas in the code domain.

Twelfth Embodiment

In a twelfth embodiment, an approach for orthogonalizing signals from respective antennas in the frequency domain in addition to orthogonalizing signals from respective mobile stations in the frequency domain is described below. A base station 30 in accordance with the twelfth embodiment can be arranged as shown in FIG. 15. The radio resource allocating unit 313 generates frequency allocation information for each mobile station so that pilot channels are orthogonal both among the mobile stations and among the antennas in the frequency domain. The frequency allocation information is transmitted from the transmission signal generating units 309-11 through 309-32 to each mobile station.

Figure 25:
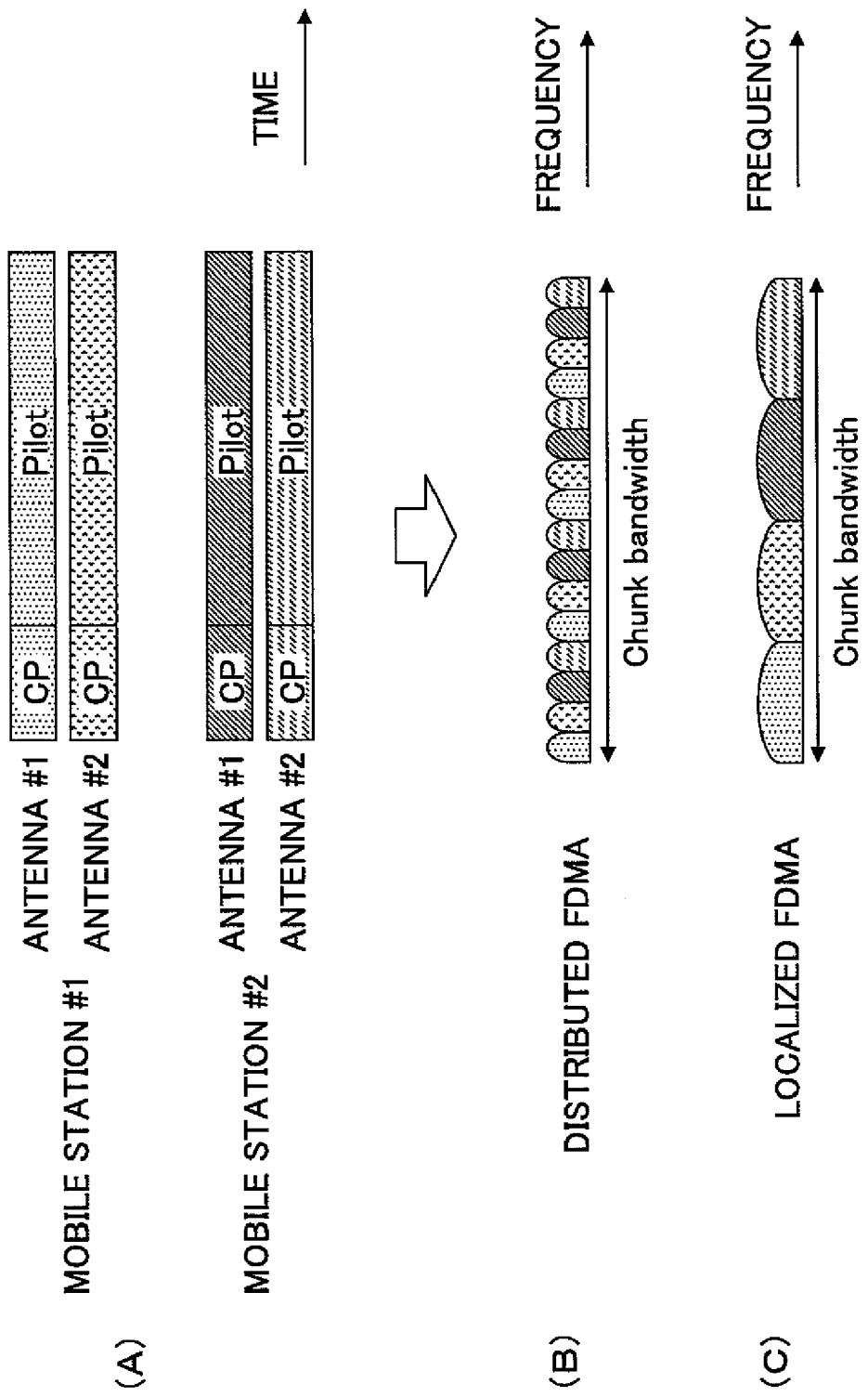
FIG. 25 shows a diagram illustrating orthogonality at a base station in accordance with a twelfth embodiment of the present invention (orthogolality in the frequency domain among mobile stations; orthogonality in the frequency domain among antennas).

FIG. 25 shows a diagram illustrating how signals from the respective antennas are orthogonal at the base station in the frequency domain in addition to how signals from the respective mobile stations are orthogonal at the base station in the frequency domain. As shown in FIG. 25(A), the pilot channels from the respective antennas in the mobile stations #1 and #2 can be orthogonalized with each other in the frequency domain. Consequently, pilot channels both among the base stations and among the antennas do not interfere with each other in the frequency domain as shown in FIG. 25(B) and FIG. 25(C).

With reference to FIG. 17, a mobile station 40 in accordance with the twelfth embodiment is described below. In the twelfth embodiment, the control unit 411 in the mobile station 40 receives frequency allocation information generated by the radio resource allocating unit 313 in the base station 30. The control unit 411 distributes the frequency allocation information to the pilot channel generating units 401-1 through 401-2 for the respective antennas, so that the signals received at the base station are orthogonal both among the mobile stations and among the antennas in the frequency domain.

The present invention is not limited to the specifically disclosed embodiments, and variations and modifications may be made without departing from the scope of the present invention.

Figure 26:
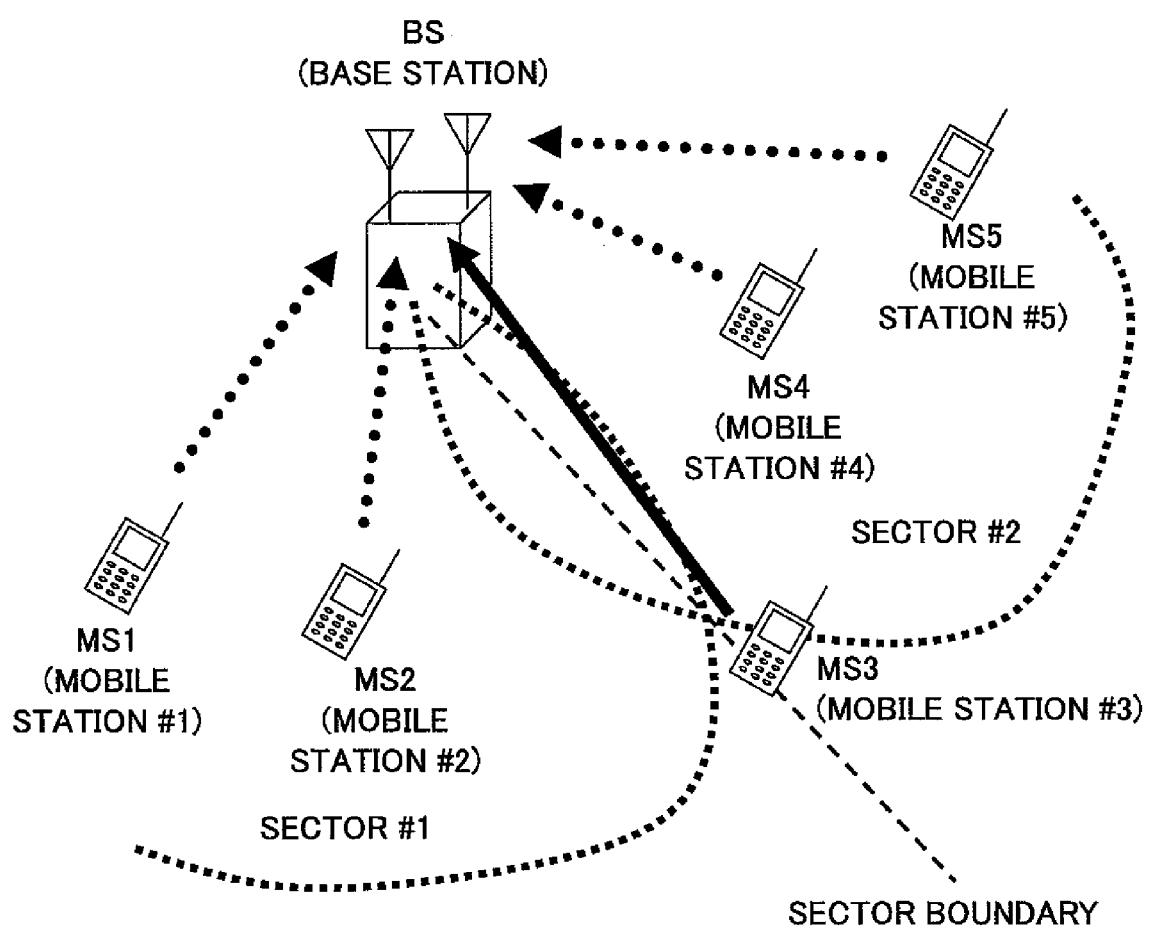
FIG. 26 shows another example of a communication system to which the present invention is applicable.

For example, in FIG. 2, the base station allocates orthogonal radio resources to mobile stations within all sectors, in order to reduce interference with signals from the mobile station #3 which is situated in the sector boundary. However, as shown in FIG. 26, the base station may allocate an orthogonal pilot sequence (a radio resource orthogonal to that for the other mobile stations) which is different from the orthogonal pilot sequence for the other mobile stations (mobile stations #1, #2, #4, #5) to only the mobile station #3 which is situated in the sector boundary (near the overlapping region among sectors). Because there is little likelihood that the mobile stations far from the sector boundary move to the other sectors, the base station may allocate the same orthogonal pilot sequence to the mobile stations #1 and #4 (or the mobile stations #2 and #5).

This international patent application is based on Japanese Priority Application No. 2005-241900 filed on Aug. 23, 2005 and No. 2005-317571 filed on Oct. 31, 2005, the entire contents of which are hereby incorporated by reference.

What is claimed is:

1. A base station which performs transmission timing control for multiple mobile stations, comprising:
    a first reception timing detecting unit configured to detect a reception timing of a packet received from a first mobile station of the multiple mobile stations which is situated in a first sector;
    a second reception timing detecting unit configured to detect a reception timing of a packet received from a second mobile station of the multiple mobile stations which is situated in a second sector;
    a transmission timing determining unit configured to determine transmission timings of signals transmitted from the first mobile station and the second mobile station based on the reception timings detected by the first reception timing detecting unit and the second reception timing detecting unit;
    a control information generating unit configured to generate transmission timing control information for the first mobile station and the second mobile station based on the transmission timings; and
    a radio resource allocating unit configured to allocate orthogonal radio resources to the first mobile station and the second mobile station.

2. The base station as claimed in claim 1, wherein:
    the radio resource allocating unit allocates the radio resources in consideration of a timing error within a guard interval.

3. The base station as claimed in claim 1, wherein:
    the radio resource allocating unit allocates the radio resources so that a signal transmitted from the first mobile station and a signal transmitted from the second mobile station are orthogonal in a time domain.

4. The base station as claimed in claim 1, wherein:
    the radio resource allocating unit allocates the radio resources so that a signal transmitted from the first mobile station and a signal transmitted from the second mobile station are orthogonal in a code domain.

5. The base station as claimed in claim 1, wherein:
    the radio resource allocating unit allocates the radio resources so that a signal transmitted from the first mobile station and a signal transmitted from the second mobile station are orthogonal in a frequency domain.

6. The base station as claimed in claim 1, wherein:
    the radio resource allocating unit allocates the orthogonal radio resources to the first mobile station and the second mobile station, when the second mobile station is situated in an overlapping region between the first sector and the second sector.

7. The base station as claimed in claim 1, wherein:
    the first mobile station and the second mobile station use a cell-specific or mobile-station-specific scrambling code.

8. The base station as claimed in claim 1, wherein:
    the first mobile station includes a first antenna and a second antenna for MIMO transmission to the base station, and
    the radio resource allocating unit allocates orthogonal radio resources to the first antenna and the second antenna.

9. The base station as claimed in claim 8, wherein:
    the radio resource allocating unit allocates the radio resources so that a signal transmitted from the first antenna and a signal transmitted from the second antenna are orthogonal in a time domain.

10. The base station as claimed in claim 8, wherein:
    the radio resource allocating unit allocates the radio resources so that a signal transmitted from the first antenna and a signal transmitted from the second antenna are orthogonal in a code domain.

11. The base station as claimed in claim 8, wherein:
    the radio resource allocating unit allocates the radio resources so that a signal transmitted from the first antenna and a signal transmitted from the second antenna are orthogonal in a frequency domain.

12. A communication system including multiple mobile stations and a base station which performs transmission timing control for the multiple mobile stations, wherein:
    the base station comprises
    a first reception timing detecting unit configured to detect a first reception timing of a packet received from a first mobile station of the multiple mobile stations which is situated in a first sector;
    a second reception timing detecting unit configured to detect a second reception timing of a packet received from a second mobile station of the multiple mobile stations which is situated in a second sector;
    a transmission timing determining unit configured to determine transmission timings of signals transmitted from the first mobile station and the second mobile station based on the first reception timing and the second reception timing;
    a control information generating unit configured to generate transmission timing control information for the first mobile station and the second mobile station based on the transmission timings; and
    a radio resource allocating unit configured to allocate orthogonal radio resources to the first mobile station and the second mobile station; and
    the mobile station includes
    a transmission timing adjusting unit configured to adjust a transmission timing of a signal based on the transmission timing control information.

* * * * *